(12) United States Patent
Ding et al.

(10) Patent No.: US 8,665,797 B2
(45) Date of Patent: Mar. 4, 2014

(54) INFORMATION FEEDBACK METHOD AND USER EQUIPMENT

(75) Inventors: Ming Ding, Shanghai (CN); Renmao Liu, Shanghai (CN); Yongming Liang, Shanghai (CN); Yingyu Zhang, Shanghai (CN); Zeng Yang, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 107 days.

(21) Appl. No.: 13/497,542

(22) PCT Filed: Jul. 15, 2010

(86) PCT No.: PCT/JP2010/062387
§ 371 (c)(1),
(2), (4) Date: Mar. 22, 2012

(87) PCT Pub. No.: WO2011/036937
PCT Pub. Date: Mar. 31, 2011

(65) Prior Publication Data
US 2012/0224551 A1    Sep. 6, 2012

(30) Foreign Application Priority Data
Sep. 28, 2009   (CN) .......................... 2009 1 0177192

(51) Int. Cl.
*H04Q 7/00*     (2006.01)
*H04H 20/67*    (2008.01)
(52) U.S. Cl.
USPC .......................................... 370/328; 370/339
(58) Field of Classification Search
USPC ..................... 370/278, 282, 328, 338, 339
See application file for complete search history.

(56) References Cited

U.S. PATENT DOCUMENTS 8,111,709 B2 *  2/2012  Hunukumbure et al. ...... 370/437
8,271,043 B2 *  9/2012  Kim et al. .................. 455/562.1
(Continued)

FOREIGN PATENT DOCUMENTS

CN         101990220 A      3/2011
WO    WO 2007/024913 A1    3/2007

OTHER PUBLICATIONS

3GPP TS 36.213 V8.3.0, 3rd Generation Partnership Project; Technical Specification Group Radio Access Network, Evolved Universal Terrestrial Radio Access (E-UTRA); Physical layer procedures, (Release 8), May 8, 2008, pp. 1-45.

(Continued)

*Primary Examiner* — Hong Cho
(74) *Attorney, Agent, or Firm* — Birch, Stewart, Kolasch & Birch, LLP

(57) ABSTRACT

The present invention discloses an information feedback method. The method comprises steps of a serving cell and/or a user equipment determining a cooperating cell set participating multi-antenna-multi-cell cooperation, the cooperating cell set including the serving cell and non-serving cells, the user equipment and/or the serving cell selecting transmit-ports of the serving cell and non-serving cells according to the determined cooperating cell set, the user equipment obtaining channel state information of the selected transmit-ports, and the user equipment feeding back identification information and the channel state information of the selected transmit-ports. The present invention provides also a serving cell, a cooperative cell and a user equipment for feeding back the identification information and channel state information of the selected transmit-ports. The present invention has advantages of simple implementation and less signaling overhead.

14 Claims, 15 Drawing Sheets

(56) References Cited

U.S. PATENT DOCUMENTS

| | | | |
|---|---|---|---|
| 8,295,778 B2 * | 10/2012 | Kotecha et al. | 455/69 |
| 2009/0323849 A1 * | 12/2009 | Bala et al. | 375/267 |
| 2010/0034314 A1 * | 2/2010 | Brown et al. | 375/295 |
| 2010/0110941 A1 * | 5/2010 | Erceg et al. | 370/278 |

OTHER PUBLICATIONS

3GPP TSG RAN WG1 #53 bis, R1-082497: "Network MIMO Precoding", Texas Instruments, Discussion and Decision, Agenda Item: 12, Jun. 30, 2008-Jul. 4, 2008, pp. 1-4.

3GPP TSG RAN WG1 #53bis, R1-082493: "Reference for CQI/PMI Reporting Offset", Texas Instrument, NEC, Discussion and Decision, Agenda Item: 6.3. Jun. 30, 2008-Jul. 4, 2008, pp. 1-3.

3GPP TSG RAN WG1 #56, R1-090752: "Clustered DFT-S-OFDM Transmission from Multiple Transmit Antennas", Nortel, Discussion/Decision, Agenda Item: 12.3, Feb. 9-13, 2009, pp. 1-5.

3GPP TSG RAN WG1 Meeting #53bis, R1-082501, "Collaborative MIMO for LTE-A downlink", Alcatel Shanghai Bell, Alcatel Lucent, Discussion and Decision, Agenda Item: 12, Jun. 30, 2008-Jul. 4, 2008, pp. 1-7.

3GPP TSG RAN WG1 Meeting #54, R1-082896: "Coordinated multi-cell transmission for LTE-Advanced downlink", ETRI, Discussion, Agenda Item: 12. Study Item on LTE-Advanced, Aug. 18-22, 2008, pp. 1-4.

3GPP TSG RAN WG1 Meeting #54bis, R1-083546: "Per-cell precoding methods for downlink joint processing CoMP", ETRI, Discussion, Agenda Item: 11. Study Item on LTE-Advanced, Sep. 29, 2008-Oct. 3, 2008, pp. 1-3.

3GPP TSG RAN WG1 Meeting #57, R1-092102: "MBSFN Precoding with Antenna Selection for DL CoMP", Sharp, Discussion and Decision, Agenda Item: 15.2, May 4-8, 2009. pp. 1-9.

3GPP TSG-RAN #57bis, R1-092427: "CSI-RS Design for Virtualized LTE Antenna in LTE-A System", Fujitsu, Discussion, Agenda Item: 15.1, Jun. 29, 2009-Jul. 3, 2009. pp. 1-7.

3GPP TSG-RAN WG1 #58, R1-093720: "CoMP email summary", Qualcomm Europe, Discussion and Decision, Agenda Item: 15.2, Aug. 24-28, 2009. pp. 1-11.

3GPP TSG-RAN Working Group 1 Meeting #56, R1-090751: "Discussion on RS Design for High-order MIMO in LTE-A", Nortel, Discussions, Agenda Item: 12.4, Feb. 9-13, 2009. pp. 1-6.

PCT/ISA/210—International Search Report dated Aug. 17, 2010, issued in PCT/JP2010/062387.

"Further Considerations on MBSFN Precoding for DL CoMP", Sharp 3GPP TSG RAN WG1 Meeting #56bis, R1-091133—Mar. 27, 2009.

* cited by examiner

INFORMATION FEEDBACK METHOD AND USER EQUIPMENT

TECHNICAL FIELD

The present invention relates generally to communication technique fields. More specifically, the present invention relates to a multi-antenna-multi-cell cooperative information feedback method and a user equipment for implementing the information feedback method.

BACKGROUND ART

Multi-antenna (MIMO: Multiple in Multiple out) wireless transmission technology configures multiple antennas at transmit side and receive side and makes use of space resources in the wireless transmission so as to obtain spatial multiplexing gain and space diversity gain. Information theory research shows that MIMO system capacity linearly increases with the minimum value of the number of transmit antennas and the number of receive-antennas. A schematic drawing of MIMO system is illustrated in FIG. 1. As shown in FIG. 1, multiple antennas at the transmit side and receive side constitute multi-antenna wireless channels including space-domain information. In addition, OFDM (Orthogonal Frequency Division Multiplexing) technology has strong anti-fading capability and high frequency efficiency and is suitable for high-speed data transmissions in a multi-path scenario and fading scenario. MIMO-OFDM technology that combines MIMO and OFDM technologies has become to a core technique of new generation mobile communication.

For example, 3GPP (the 3rd Generation Partnership Project) organization is an international organization in mobile communication fields and plays an important role in standardization work of 3G cellular communication technologies. 3GPP organization started to design EUTRA (Evolved Universal Mobile Telecommunications System Terrestrial Radio Access) and EUTRAN (Evolved Universal Mobile Telecommunications System Terrestrial Radio Access Network) which is also called LTE (Long Term Evolution) project from the latter half in 2004. Downlinks of LTE system adopt the MIMO-OFDM technology. From 3GPP organization Meeting in April 2008 in Shenzhen, China, standardization work of 4G cellular communication system (now called LTE-A system) began to be discussed. During the meeting, a concept "multi-antenna-multi-cell cooperation" has been widely considered and supported and its basic principle is to provide communication services to one user or more users simultaneously by using a plurality of base stations so as to improve data transmission rate of cell edge users.

Generally speaking, in a downlink multi-antenna-multi-cell cooperative system, the user equipment needs to feed back channel state information (CSI) to the base station and then the base station is able to conduct operations such as corresponding wireless resource management. There are three kinds of channel state information feedback methods in the conventional technical Literatures.

Perfect channel state information feedback: the user equipment quantizes all elements in a receive-side channel matrix and feedbacks the elements to the base station one by one; or the user equipment obtains an instantaneous covariance matrix of a channel matrix of the receive-transmit-side, quantizes all elements in the covariance matrix and feedbacks the elements to the base station one by one. Thus the base station can reconstruct relatively accurate channels based on the quantized channels fed back from the user equipment (see non-patent Literature 1: 3GPP R1-093720, "CoMP email summary", Qualcomm). FIG. 2 is an implementation schematic diagram illustrating this method.

Statistics based channel state information feedback: the user equipment conducts statistic processing for the channel matrix of the receive-transmit side, for example, calculating its covariance matrix, then quantizes the statistic information and feedbacks to the base station. The base station obtains statistics channel state information according to the feedback from the user equipment (see non-patent Literature 1: 3GPP R1-093720, "CoMP email summary", Qualcomm). FIG. 3 is an implementation schematic diagram illustrating this method.

Code space search based channel state information feedback: the user equipment and the base station predefine a finite set of the channel state information (i.e., a codebook space. A codebook space in common use includes a channel rank and/or precoding matrix and/or channel quality indicator, etc.). When detecting the channel matrix of the receive-transmit side, the user equipment searches for the best channel state information element matched to the current channel matrix in the codebook space and feedbacks an index of the element to the base station. The base station queries the predefined codebook space according to the index and obtains rough channel state information (see non-patent Literature 2: 3GPP R1-083546, "Per-cell precoding methods for downlink joint processing CoMP", ETRI). FIG. 4 is an implementation schematic diagram illustrating this method.

Among the above three methods, the perfect channel state information feedback method has the best feedback effect, but it has the largest feedback overhead and is difficult to be implemented in a real system. Especially in the multi-antenna-multi-cell cooperative system, its feedback overhead fold increases with increment of the number of base stations and thus leads to high implementation difficulty. The code space search based channel state information feedback method has the least feedback overhead but its effect is bad. The reason is that this method could not depict the channel state accurately so that the transmit-side can not fully utilize channel characteristics for pertinent transmission. However, this method is simple in implementation and the feedback can be achieved with several bits, thus it is widely applied in the real system. In comparison, the statistics-based channel state information feedback method achieves a good trade-off between above two methods. This method can use less feedback amount to accurately depict the channel state when the channel state has obvious statistic information so that desire effects can be achieved.

In the downlink multi-antenna-multi-cell cooperative system, the channel state information feedback method is often combined with a detailed cooperative scheme. In some technical Literatures, there are five cooperative schemes for the downlink multi-antenna-multi-cell cooperation.

(1) Virtual Mimo Technology Based Scheme multi-cells with multiple antennas are considered as a single-cell MIMO system with more virtual antennas so as to achieve large space multiplexing and space diversity gain. Moreover, repeatedly utilizing single-cell MIMO system mechanism is helpful to reduce implementation complexity of the multi-antenna-multi-cell system. This scheme can adopt any one of above-mentioned three kinds of channel state information feedback methods to feed back the channel state information (see non-patent Literature 3: 3GPP, R1-082501, "Collaborative MIMO for LTE-A downlink", Alcatel-Lucent). FIG. 5 is an implementation schematic diagram illustrating this scheme.

(2) Single-Cell Independent Operation Based Scheme

A single-cell (base station) configured with a plurality of antennas independently provides services to the user equipment and the user equipment adds data from a plurality of single-cells together and thus obtains high space multiplexing and space diversity gain. This scheme is simple in implementations and its signaling overhead is less. This scheme can adopt any one of above-mentioned three kinds of channel state information feedback methods to feed back the channel state information (see non-patent Literature 4: 3GPP, R1-082497, "Network MIMO Precoding", Texas Instruments). FIG. 6 is an implementation schematic diagram illustrating this scheme.

(3) A Scheme of Simply Combining Channels of Multi-Cells

From view of the user equipment, channel matrixes from cooperative cells to the user equipment could be added and combined directly so as to constitute a virtual channel. Then the single-cell MIMO technology could be applied mechanically. This scheme can adopt any one of above-mentioned three kinds of channel state information feedback methods to feed back the channel state information (see non-patent Literature 2: 3GPP R1-083546, "Per-cell precoding methods for downlink joint processing CoMP", ETRI). FIG. 7 is an implementation schematic diagram illustrating this scheme.

(4) A Scheme of Simply Combining Channels of Multi-Cells in Combination of Antenna Selection On the basis of scheme (3), this scheme firstly performs antenna selection for the cooperative cells and directly adds and combines channel matrixes from the cooperative cells subject to the antenna selection to the user equipment so as to constitute a virtual channel. Then single-cell MIMO technologies could be applied mechanically. Since antenna selection information is included in this scheme, it can partially reduce the feedback overhead of the perfect channel state information, i.e., the user equipment only feedbacks the perfect channel state information of selected antennas. Moreover, this scheme could be combined with above statistics based channel state information feedback scheme or codebook space search based channel state information feedback scheme (see non-patent Literature 5: 3GPP, R1-092102, "MBSFN Precoding with Antenna Selection for DL CoMP", SHARP). FIG. 8 is an implementation schematic diagram illustrating this scheme.

(5) A Scheme of Reconstructing Multi-Cell Channels in Combination with Transmit-Port Selection The user equipment and/or the cell semi-statically or dynamically select ports for cell cooperative transmission so as to constitute a virtual channel. Then single-cell MIMO technologies could be applied mechanically. Since antenna selection information is included in this scheme, it can partially reduce the feedback overhead of the perfect channel state information, i.e., the user equipment only feedbacks the perfect channel state information of selected antennas. Moreover, this scheme could be combined with above statistics based channel state information feedback scheme or codebook space search based channel state information feedback scheme (see Chinese patent application No.200910162519.9 (Agent docket number IA094046A), "a downlink multi-antenna-multi-cell cooperative method, base station and user equipment", SHARP). FIG. 9 is an implementation schematic diagram illustrating this scheme.

It is to be noted that the transmission port in the scheme (5) is a wide concept which covers the concept of antenna in the scheme (4). Therefore, the term "transmission port selection" will be adopted in the following descriptions.

In general, the virtual MIMO technology based scheme (1) considers a global optimum MIMO configuration, which has better performances but with high complexity. Especially when the antenna number of a single cooperative cell is too large, the total antenna number of the virtual MIMO system will fold increase, which causes that the system overhead is too high in each aspect to operate. The single-cell independent operation based scheme (2) reduces the implementation complexity, however, the cell cooperation level decreases and the system performance is bad. The scheme (3) simply combines channels of the cooperative cells, which has the advantage of simple implementation and low feedback overhead and has disadvantage of bad performance. The scheme (4) and scheme (5) utilize the transmission port selection so that better system performance could be achieved, but feeding back indexes of the transmission ports still needs large overhead. Furthermore, how to jointly design the feedback scheme of the multi-antenna-multi-cell cooperative system and the feedback scheme of the single-cell system is a new task.

Therefore, the present invention provides a channel state information feedback method with less overhead for the multi-antenna-multi-cell system with transmission port selection based on the above scheme (4) and scheme (5) and meanwhile considers the joint design of the multi-cell feedback and the single-cell feedback.

SUMMARY OF INVENTION

The present invention aims to overcome deficiencies of large feedback overhead in prior arts and provides a downlink multi-antenna-multi-cell cooperative feedback method and a cell (base station). Firstly, a serving base station configures a user equipment in a multi-antenna-multi-cell cooperative mode, and the configuration at least includes that the serving cell and/or the user equipment determine a cooperating cell set and adopt a cooperative method with characteristics of transmit-port selection. Then the user equipment feedbacks the selected transmit-port information and other channel state information. The present invention has advantages of simple implementation and less signaling overhead.

According to a first aspect of the present invention, there is provided an information feedback method. The method comprises that a serving cell and/or a user equipment determines a cooperating cell set participating in a multi-antenna-multi-cell cooperation, the cooperating cell set including the serving cell and non-serving cells, the user equipment and/or the serving cell selects transmit-ports of the serving cell and non-serving cells according to the determined cooperating cell set, the user equipment obtains channel state information of the selected transmit-ports, and the user equipment feedbacks identification information and the channel state information of the selected transmit-ports.

Preferably, the information feedback method further includes that the serving cell allocates resources to the user equipment according to feedback information from the user equipment, and the serving cell and a cooperating cell cooperatively transmit data signal to the user equipment through respectively selected transmit-ports of themselves.

Preferably, the user equipment feedbacks the identification information of selected transmit-ports of respective cooperative cells with a first feedback period, and feedbacks the channel state information of selected transmit-ports with a second feedback period. More preferably, if feeding back the identification information of selected transmit-ports of respective cooperative cells and feeding back the channel state information of selected transmit-ports collide in the same transmission time interval, simultaneous feedback is adopted, or only the identification information of selected transmit-ports of respective cooperative cells is fed back, or the identification information of selected transmit-ports of respective cooperative cells and a part of the channel state information of selected transmit-ports are fed back.

Preferably, the user equipment and/or the serving cell select all transmit-ports of the serving cell, and the user equipment feedbacks the identification information of selected transmit-ports of respective non-serving cells with a first feedback period, and feedbacks the channel state information of all transmit-ports of the serving cell and the channel state information of selected transmit-ports of respective non-serving cells with a second feedback period. More preferably, if feeding back the identification information of selected transmit-ports of respective non-serving cells and feeding back the channel state information of selected transmit-ports collide in the same transmission time interval, simultaneous feedback is adopted, or only the identification information of selected transmit-ports of respective non-serving cells is fed back, or the identification information of selected transmit-ports of respective non-serving cells and a part of the channel state information of selected transmit-ports are fed back.

Preferably, the information feedback method further includes that the user equipment feedbacks channel cross-correlation information between cooperative cells with the second feedback period. More preferably, if feeding back the identification information of selected transmit-ports of respective non-serving cells collides with feeding back the channel state information of selected transmit-ports and/or the channel cross-correlation information between cooperative cells in the same transmission time interval, simultaneous feedback is adopted, or only the identification information of selected transmit-ports of respective non-serving cells is fed back, or all the identification information of selected transmit-ports of respective non-serving cells and a part of the channel state information of selected transmit-ports and/or the channel cross-correlation information between cooperative cells are fed back.

According to a second aspect of the present invention, there is provided a user equipment. The user equipment includes a transceiver unit configured to receive or transmit wireless information from or to a serving cell, a cooperating cell set determination unit configured to determine a cooperating cell set participating in a multi-antenna-multi-cell cooperation, the cooperating cell set including the serving cell and non-serving cells, a transmit-port selection unit configured to select transmit-ports of the serving cell and non-serving cells in the determined cooperating cell set, a channel state information acquisition unit configured to obtain channel state information of the selected transmit-ports, and an information feedback unit configured to feed back identification information and the channel state information of the selected transmit-ports through the transceiver unit.

Preferably, the cooperating cell set determination unit directly determines the cooperating cell set statically configured, or semi-statically configured or selected by the serving cell from the wireless information received by the transceiver unit, and the transmit-port selection unit directly selects the transmit-ports statically configured, or semi-statically configured or selected by the serving cell from the wireless information received by the transceiver unit.

Preferably, the information feedback unit feedbacks the identification information of selected transmit-ports of respective cooperative cells with a first feedback period, and feedbacks the channel state information of selected transmit-ports with a second feedback period. More preferably, if feeding back the identification information of selected transmit-ports of respective cooperative cells and feeding back the channel state information of selected transmit-ports collide in the same transmission time interval, the information feedback unit adopts simultaneous feedback, or only feedbacks the identification information of selected transmit-ports of respective cooperative cells, or feedbacks the identification information of selected transmit-ports of respective cooperative cells and a part of the channel state information of selected transmit-ports.

Preferably, the transmit-port selection unit selects all transmit-ports of the serving cell or information relative to the selected transmit-ports indicates that all transmit-ports of the serving cell are selected, and the information feedback unit feedbacks the identification information of selected transmit-ports of respective non-serving cells with a first feedback period, and feedbacks the channel state information of all selected transmit-ports of the serving cell and the channel state information of selected transmit-ports of respective non-serving cells with a second feedback period. More preferably, if feeding back the identification information of selected transmit-ports of respective non-serving cells and feeding back the channel state information of selected transmit-ports collide in the same transmission time interval, the information feedback unit adopts simultaneous feedback, or only feedbacks the identification information of selected transmit-ports of respective non-serving cells, or feedbacks the identification information of selected transmit-ports of respective non-serving cells and a part of the channel state information of selected transmit-ports.

Preferably, the user equipment feedbacks channel cross-correlation information between cooperative cells with the second feedback period. More preferably, if feeding back the identification information of selected transmit-ports of respective non-serving cells collides with feeding back the channel state information of selected transmit-ports and/or the channel cross-correlation information between cooperative cells in the same transmission time interval, the information feedback unit adopts simultaneous feedback, or only feedbacks the identification information of selected transmit-ports of respective non-serving cells, or feedbacks all the identification information of selected transmit-ports of respective non-serving cells and a part of the channel state information of selected transmit-ports and/or the channel cross-correlation information between cooperative cells.

The channel state information is one kind or a combination of several kinds of following information: perfect channel state information, statistics based channel state information and codebook space search based channel state information. The codebook space search based channel state information comprises at least one of channel rank, precoding matrix and channel quality indicator.

Moreover, the first feedback period can be longer than the second feedback period.

According to embodiments of the present invention, the information feedback method includes following steps.

Step 1: the serving cell and/or the user equipment determine a cooperating cell set (including the serving cell and non-serving cells) that participates in the multi-antenna-multi-cell cooperation.

Step 2: the user equipment and/or the serving cell select transmit-ports of cooperative cells according to the determined cooperating cell set.

The multi-antenna-multi-cell cooperative method can adopt the scheme (4), i.e., selecting transmit-ports of the cooperative cells, directly adding and combining channel matrixes from the cooperative cells subject to the antenna selection to the user equipment to form a virtual channel, and then mechanically applying single-cell MIMO technologies.

Optionally, the multi-antenna-multi-cell cooperative method can adopt the scheme (5), i.e., the user equipment and/or the base station (semi-) statically or dynamically select cooperative transmit-ports of cells to form a virtual channel and then mechanically apply the single-cell MIMO technologies.

Step 3: the user equipment obtains the channel state information of selected transmit-ports.

The user equipment estimates downlink channels from all ports of the cooperating cells to the user equipment according to downlink reference signal of the cooperating cell set (including the serving cell and non-serving cells), then the user equipment selects necessary transmit-ports so as to obtain the channel state information of selected transmit-ports.

Step 4: the user equipment feedbacks identification information and other channel state information of the selected transmit-ports. Any one of following manners can be adopted for the information feedback.

(1) the user equipment feedbacks transmit-port indexes of a plurality of cooperative cells with a relatively long feedback period and feedbacks the channel state information of the selected transmit-ports with a relatively short period. Preferably, if the feedback of the transmit-port indexes of a plurality of cooperative cells and the feedback of the channel state information of selected transmit-ports collide within the same transmission time interval, simultaneous feedback can be adopted; or the feedback of the channel state information of selected transmit-ports can be removed but the feedback of the transmit-port indexes of a plurality of cooperative cells is remained; or only a part of the channel state information of selected transmit-ports is fed back but the feedback of the transmit-port indexes of a plurality of serving cells is remained.

(2) the user equipment feedbacks transmit-port indexes of non-serving cells with a relatively long feedback period and feedbacks, with a relatively short period, the channel state information of all transmit-ports of the serving cell and the channel state information of the non-serving cells under the condition of transmit-ports. Preferably, if the feedback of the transmit-port indexes of non-serving cells and the feedback of other information collide within the same transmission time interval, simultaneous feedback can be adopted; or the feedback of the channel state information of the serving cell and/or the channel state information of non-serving cells under the condition of transmit-ports can be removed but the feedback of the transmit-port indexes of non-serving cells under the condition of transmit-ports is remained; or only a part of the channel state information of the serving cell and/or the channel state information of non-serving cells under the condition of transmit-port is fed back but the feedback of the transmit-port indexes of non-serving cells is remained.

(3) the user equipment feedbacks transmit-port indexes of non-serving cells with a relatively long feedback period and feedbacks, with a relatively short period, the channel state information of all transmit-ports of the serving cell and the channel state information of the non-serving cells under the condition of transmit-ports. Moreover, the user equipment feedbacks channel cross-correlation information between cells. Preferably, if the feedback of the transmit-port indexes of non-serving cells and other feedback formats collide within the same transmission time interval, simultaneous feedback can be adopted; or the feedback of the channel state information of the serving cell and/or the channel state information of the non-serving cells under the condition of transmit-ports and/or the channel cross-correlation information between cells can be removed but the feedback of the transmit-port indexes of the non-serving cells is remained; or only a part of the channel state information of the serving cell and/or the channel state information of the non-serving cells under the condition of transmit-ports and/or the channel cross-correlation information between cells is fed back but the feedback of the transmit-port indexes of the non-serving cells is remained.

And then, the serving cell allocates resources to the user equipment according to feedback information from the user equipment and the serving cell and cooperative cells cooperatively transmit data signals to the user equipment through their respectively selected transmit-ports.

According to the present invention, selected transmit-port indexes (identification information) and other channel state information can be fed back with different feedback periods. Moreover, when the feedbacks collide the transmit-port index (identification information) has higher priority than the other channel state information.

Therefore, the multi-antenna-multi-cell cooperative information feedback method and the user equipment provided by the present invention have the advantages of simple implementations and less signaling overhead.

BRIEF DESCRIPTION OF DRAWINGS

The foregoing and other objectives, features, and advantages of the invention will be more readily understood upon consideration of the following detailed description of the invention, taken in conjunction with the accompanying drawings.

FIG. 1 is a schematic diagram illustrating a MIMO system.

FIG. 2 is a schematic drawing illustrating a perfect channel state information feedback scheme.

FIG. 3 is a schematic drawing illustrating a statistics based channel state information feedback scheme.

FIG. 4 is a schematic drawing illustrating a codebook space search based channel state information feedback scheme.

FIG. 5 is a schematic drawing illustrating three base stations cooperatively adopting scheme (1);

FIG. 6 is a schematic drawing illustrating three base stations cooperatively adopting scheme (2);

FIG. 7 is a schematic drawing illustrating three base stations cooperatively adopting scheme (3);

FIG. 8 is a schematic drawing illustrating three base stations cooperatively adopting scheme (4);

FIG. 9 is a schematic drawing illustrating three base stations cooperatively adopting scheme (5);

FIG. 10 is a schematic drawing illustrating multi-cell cellular communication system;

FIG. 11 is a flow chart illustrating a cooperative feedback method for downlink multi-antenna-multi-cell according to an embodiment of the present invention;

FIG. 12 is a schematic drawing illustrating user equipment configuration in embodiment scenario (a);

FIG. 13 is a schematic drawing illustrating user equipment configuration in embodiment scenario (b);

FIG. 14 is a schematic drawing illustrating user equipment configuration in embodiment scenario (c);

FIG. 15 is a schematic drawing illustrating user equipment configuration in embodiment scenario (d);

FIG. 16 is a schematic drawing illustrating user equipment feedback in embodiment scenarios (a)/(c);

FIG. 17 is a schematic drawing illustrating user equipment feedback in example scenarios (b-1)/(d-1);

FIG. 18 is a schematic drawing illustrating user equipment feedback in example scenarios (b-2)/(d-2);

FIG. 19 is a schematic drawing illustrating antenna combination method.

FIG. 20 is a block diagram illustrating a user equipment 2000 according to an embodiment of the present invention.

DESCRIPTION OF EMBODIMENTS

Preferred embodiments will be explained by referring to the accompanying drawings. Unnecessary parts and functions for the present invention will be omitted for brevity so as to avoid confusion in understanding.

In order to clearly clarify implementing steps of the present invention, embodiments applicable to downlink LTE cellular communication system according to the present invention are presented in the following descriptions. It is to be noted that the present invention is not limited to the following descriptions, but is also applicable to other communication system such as LTE-A system in the near future.

Figure 1:
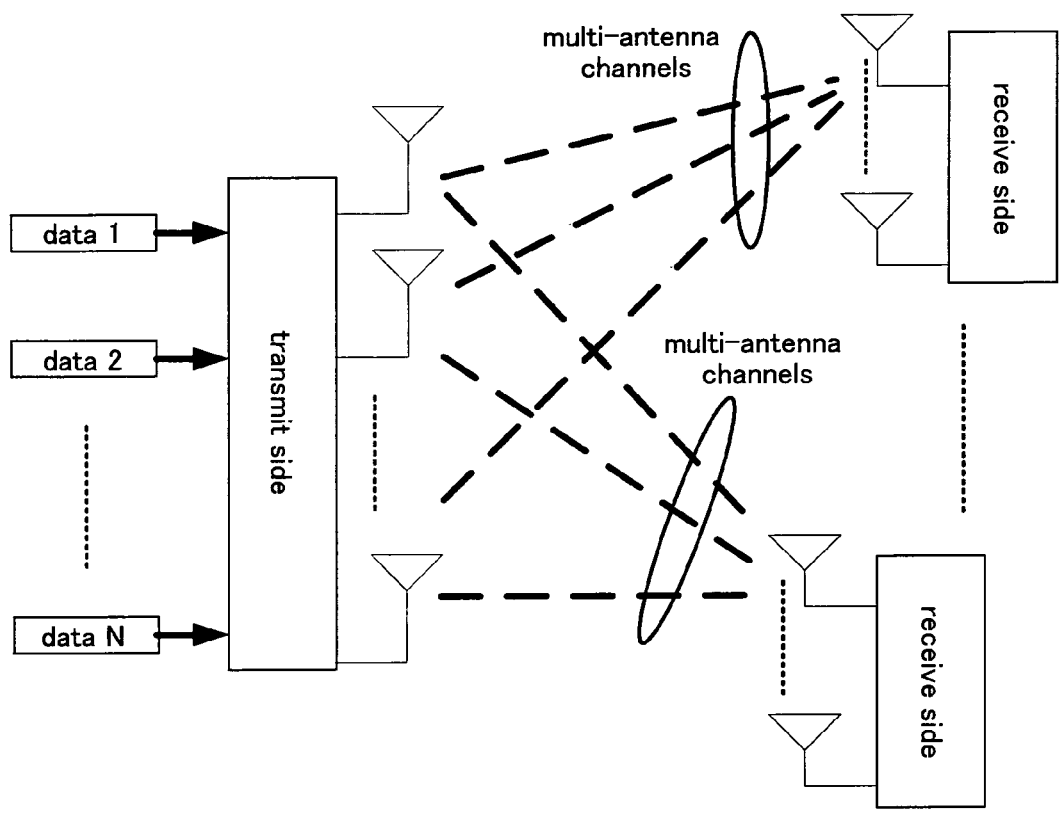
FIG. 1
Figure 2:
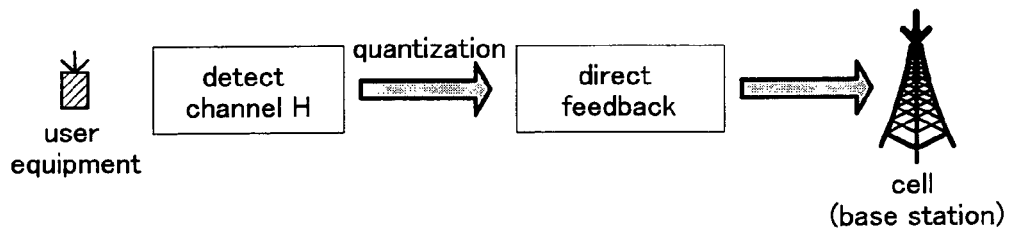
FIG. 2
Figure 3:
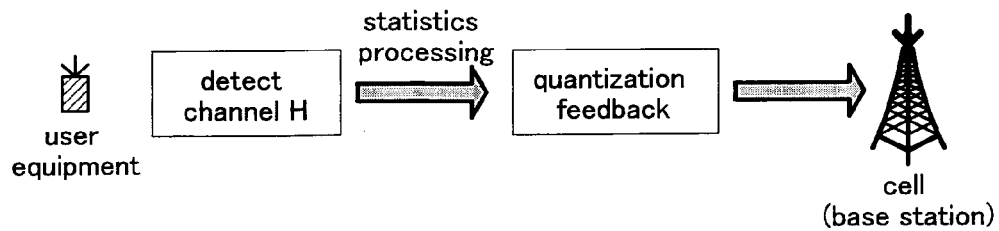
FIG. 3
Figure 4:
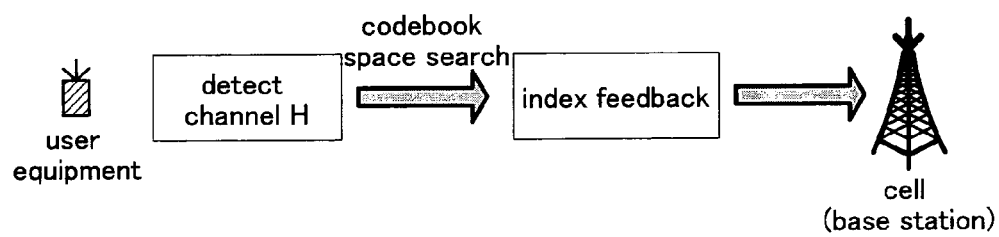
FIG. 4
Figure 5:
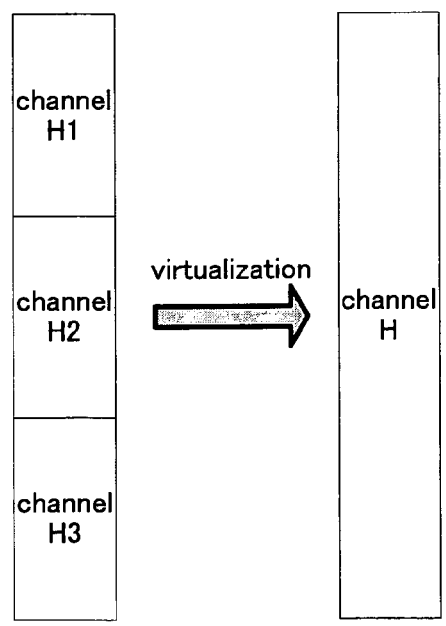
FIG. 5
Figure 6:
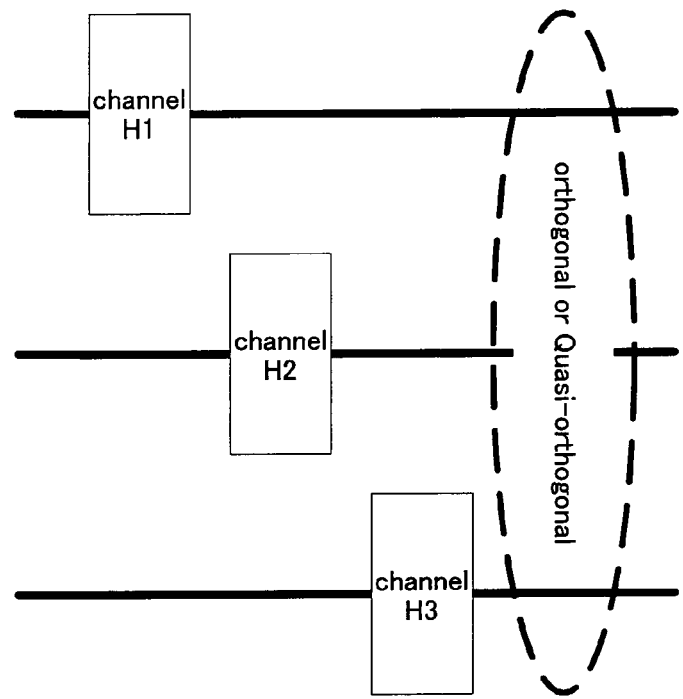
FIG. 6
Figure 7:
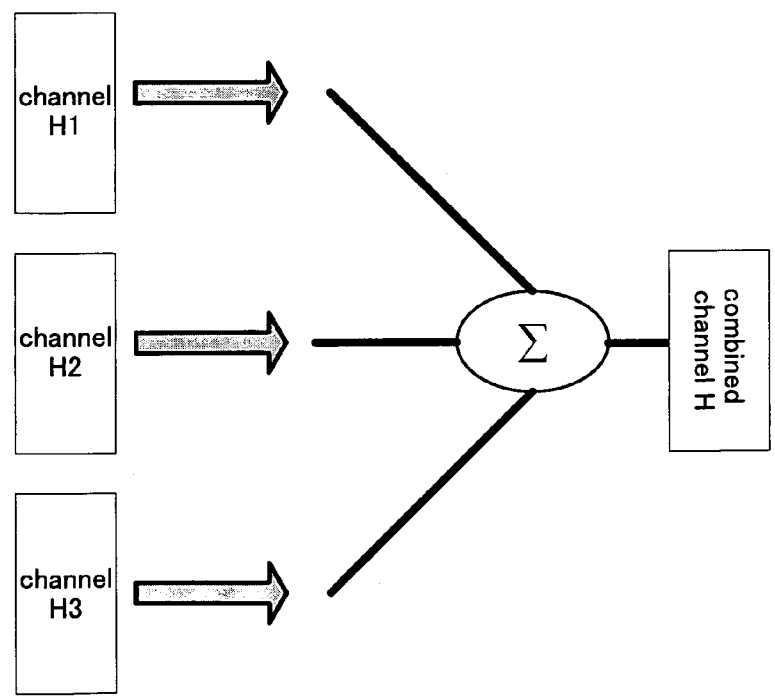
FIG. 7
Figure 8:
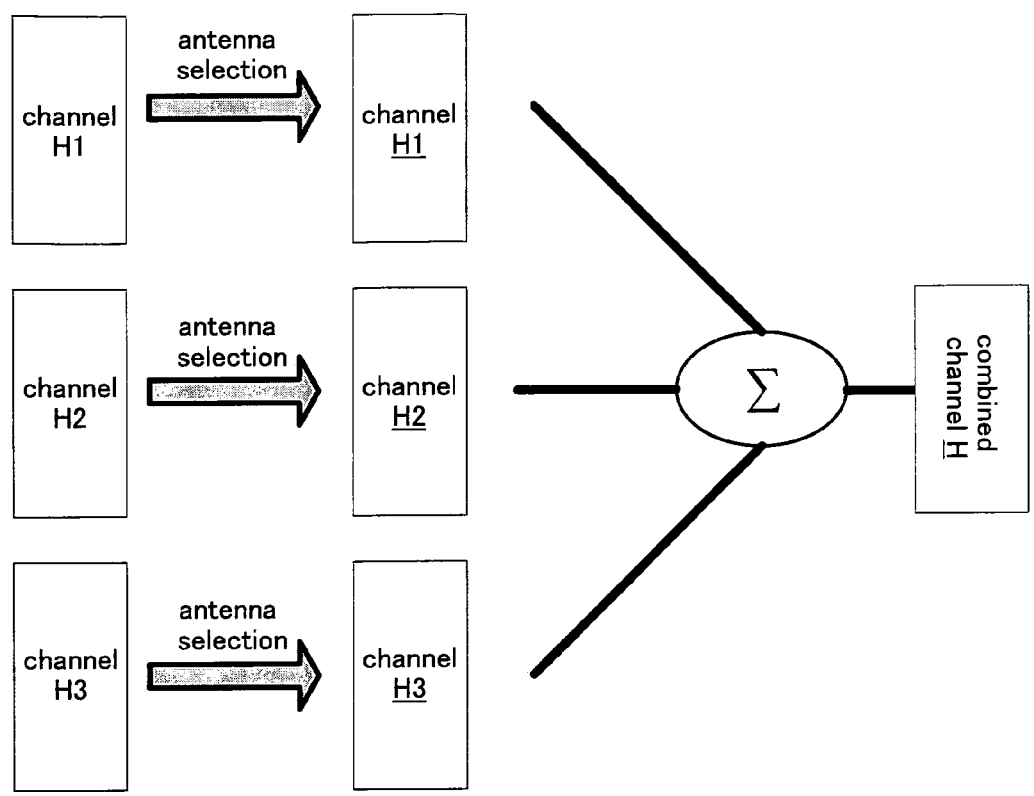
FIG. 8
Figure 9:
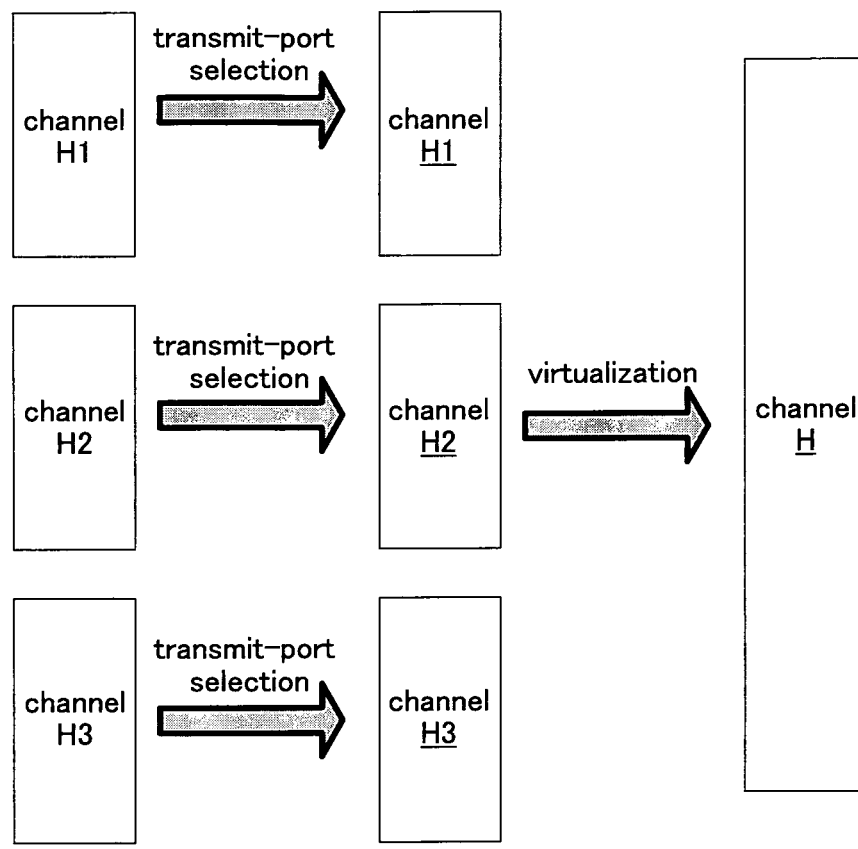
FIG. 9
Figure 10:
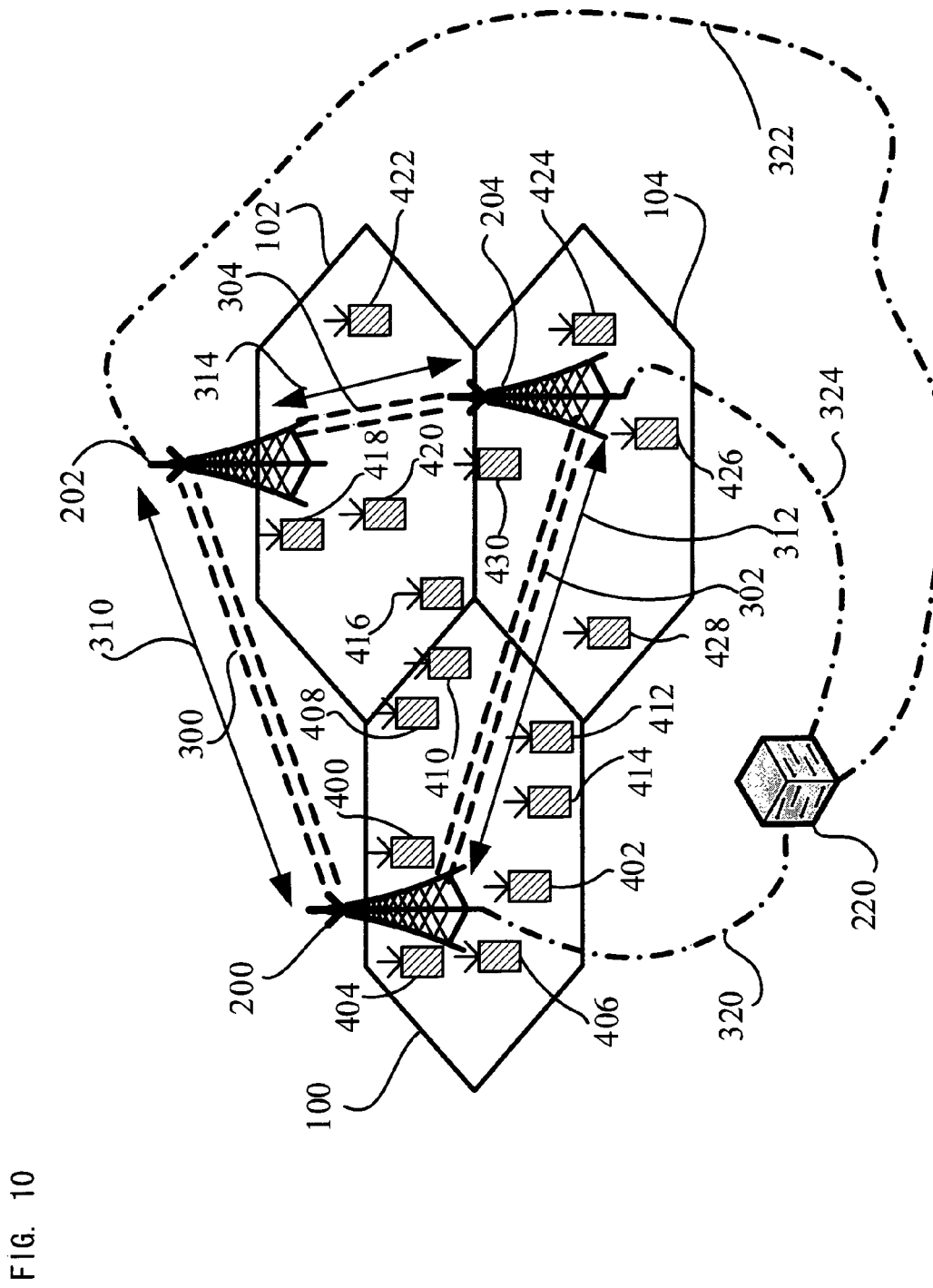
FIG. 10

FIG. 10 is a schematic drawing illustrating a multi-cell communication system. The cellular system divides service-covered area into conjoint wireless covered areas, i.e., cells. In FIG. 10, the cell is schematically depicted as a regular hexagon and the whole service area is conjoined by cells 100-104. Cells 100-104 are respectively related to base stations 200-204. Each one of the base stations 200-204 includes at least a transmitter and a receiver as well known in the art. Note that the base station is basically a serving node in the cell, which may be an independent base station with a resource scheduling function, a transmit node dependent on the independent base station, or a relay node (usually configured to further enlarge the cell covered range). In FIG. 10, the base stations 200-204 are schematically depicted as locating at certain areas in the cells 100-104 and are configured with omni-directional antennas. However, in the cell layout of the cellular communication system, the base stations 200-204 may be configured with directional antennas directionally covering partial areas of the cells 100-104 and such partial areas are normally called sectors. Therefore, the illustrated example of the multi-cell communication system in FIG. 10 is only for illustration purpose, and it does not mean that implementation of the present invention in the cellular system requires the above limited specific conditions.

In FIG. 10, the base stations 200-204 are connected with each other through X2 interfaces 300-304. In LTE system, a three-layer node network structure consisting of a base station, wireless network control unit and cored network is simplified into a two-layer node structure. Functions of the wireless network control unit are assigned to the base station, and the base stations coordinate and communicate through wired interface "X2".

In FIG. 10, there are connected air interfaces "A1 interfaces" 310-314 among the base stations 200-204. In the future communication system, the concept of relay nodes may be introduced and the relay nodes are connected through wireless interfaces. The base station may be considered as a special relay node and thus there may exist wireless interfaces "A1" between the base stations for coordination and communication.

FIG. 10 further illustrates an upper layer entity 220 (or other network entity such as a gateway or a mobile management entity) of the base stations 200-204, which is connected with the base stations 200-204 through S1 interfaces 320-324. In the LTE system, the upper layer entity and the base station coordinate and communicate through wired interfaces "S1" therebetween.

In FIG. 10, a few user equipments 400-430 are distributed in the cells 100-104. As known by the skills in the art, each of the user equipments 400-430 includes a transmitter, a receiver and a mobile terminal control unit. Each of the user equipments 400-430 accesses a cellular communication system through a serving base station (serving cell, one of base stations 200-204) serving the user equipment individually. It is to be noted that although FIG. 10 schematically illustrates 16 user equipments, the number of the user equipments in practical environment is very large. The illustration of user equipments in FIG. 10 is only for the depictive purpose. Each of the user equipments 400-430 accesses the cellular communication system through a serving base station 200-204 serving the user equipment individually. A base station providing services to a user equipment directly is called a serving base station (serving cell) of the user equipment and other base stations are called non-serving base stations (non-serving cell) of the user equipment. The non-serving base station can be a cooperative base station of the serving base station, and can together with the serving base station provide communication services to the user equipment.

In the present embodiment, it is assumed that the user equipment 416 is configured with two receive antennas and works in a multi-antenna-multi-cell cooperative mode, the serving base station is base station 202 and the cooperative base stations are base stations 200 and 204. Note that although the present embodiment aims at the user equipment 416, it does not mean that the present invention is applicable to only one user equipment. In practical, the present invention is applicable to multi-user-equipments scenario. For example, user equipments 408, 410, 430 and etc in FIG. 10 may adopt the method of present invention. There is one serving base station and two cooperative base stations in the implementary scenario, however, the present invention is not limited to such limited conditions. In fact, there is no specific limitation on the number of the serving base stations and cooperative base stations.

In the various embodiments of the present description, detailed configuration of LTE system may refer to a Literature of 3GPP organization "TS 36.213 V8.3.0, "Evolved Universal Terrestrial Radio Access (E-UTRA); Physical Layer Procedures"". The Literature defines seven MIMO transmission schemes for downlink data:

(1) single antenna transmission scheme: this scheme utilizes single antenna to transmit a signal and is a specific example of MIMO system. This scheme can only transmit single layer data.

(2) transmit diversity scheme: in MIMO system, diversity effects of time and/or frequency are utilized to transmit the signal so as to improve reception quality of the signal. This scheme can only transmit single layer data.

(3) open-loop spatial multiplexing scheme: it is not necessary for the user equipment to feedback spatial multiplexing of space-domain precoding information.

(4) close-loop spatial multiplexing scheme: it is necessary for the user equipment to feedback spatial multiplexing of the channel station information.

(5) multi-user MIMO: multiple users perform the downlink communication of MIMO system in the same frequency simultaneously.

(6) close-loop single-layer precoding: this scheme transmits only single-layer data by using MIMO system and precoding technology.

(7) beamforming transmission: this scheme adopts MIMO system and beamforming technologies and is configured with a dedicated reference signal for data demodulation of the user equipment.

It is to be noted that in the present invention when the serving cell (serving base station) and the cooperative cell (cooperative base station) of the user equipment adopt the transmission scheme of transmit diversity, the transmit diversity may be combinations or extensions of various diversity technologies such as time diversity, frequency diversity, space diversity, phase delay diversity, etc. The diversity processing may be a centralized processing or a distributed processing. It is to be further noted that adopting downlink data transmission scheme defined by the LTE system is only an example for explaining the present invention and it does not mean that the present invention requires the above limited conditions in the implementation procedure.

A following multi-antenna-multi-cell cooperation scenario is adopted to explain the present embodiment.

Embodiment scenario: the user equipment 416 is configured with four receive antennas and works in a downlink multi-antenna-multi-cell cooperative mode. The serving cell (base station) of the user equipment 416 is base station 202 and cooperative cells (base stations) are base stations 200 and 204. In multi-antenna-multi-cell cooperation transmission, the base stations 200, 202 and 204 all use four transmit-ports.

It is to be noted that detailed numerical values in above consistent transmit-port configurations are used as an example for explaining the present invention and the present invention is not limited to these numerical value limitations and is applicable to other any transmit-port configuration scenarios. Note that those skills in the art may understand that the scheme proposed by the present invention may be applied to any transmit-port configuration scenario in normal circumstances by reading embodiments of the present invention.

Figure 11:
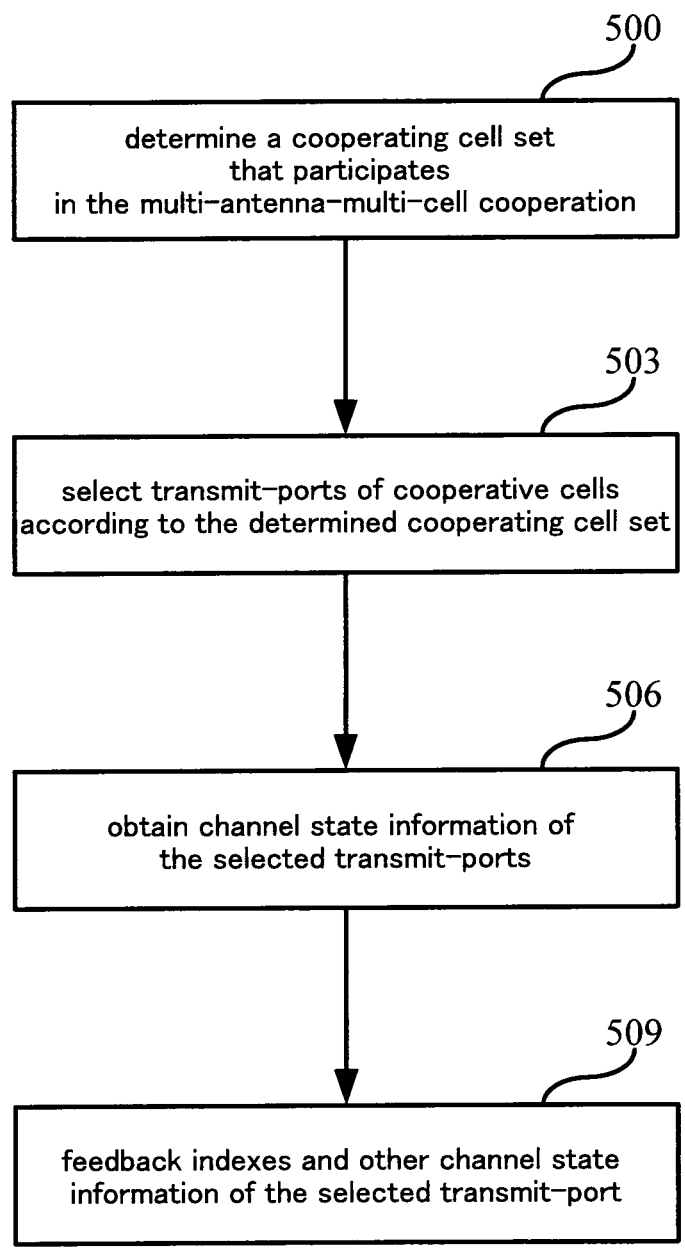
FIG. 11

FIG. 11 is a flow chart illustrating a multi-antenna-multi-cell cooperative feedback method according to an embodiment of the present invention.

As shown in FIG. 11, the method according to the present invention includes following steps.

Step 500: the serving cell and/or the user equipment determine a cooperating cell set (including the serving cell and non-serving cell) that participates in the multi-antenna-multi-cell cooperation.

Step 503: the user equipment and/or the serving cell select a transmit-port (or transmit-ports) of the cooperative cell according to the determined cooperating cell set.

Preferably, the multi-antenna-multi-cell cooperative method can adopt above scheme (4), i.e., selecting transmit-ports of the cooperative cell, directly adding and combining channel matrixes from the cooperative cells subject to the antenna selection to the user equipment so as to constitute a virtual channel, and then applying mechanically the single-cell MIMO technologies.

Preferably, the multi-antenna-multi-cell cooperative method can adopt above scheme (5), i.e., the user equipment and/or the serving cell (semi) statically or dynamically select cooperative transmit-ports of the base stations so as to constitute a virtual channel, and then apply mechanically the single-cell MIMO technologies.

In the present embodiment, four application examples are described.

Figure 12:
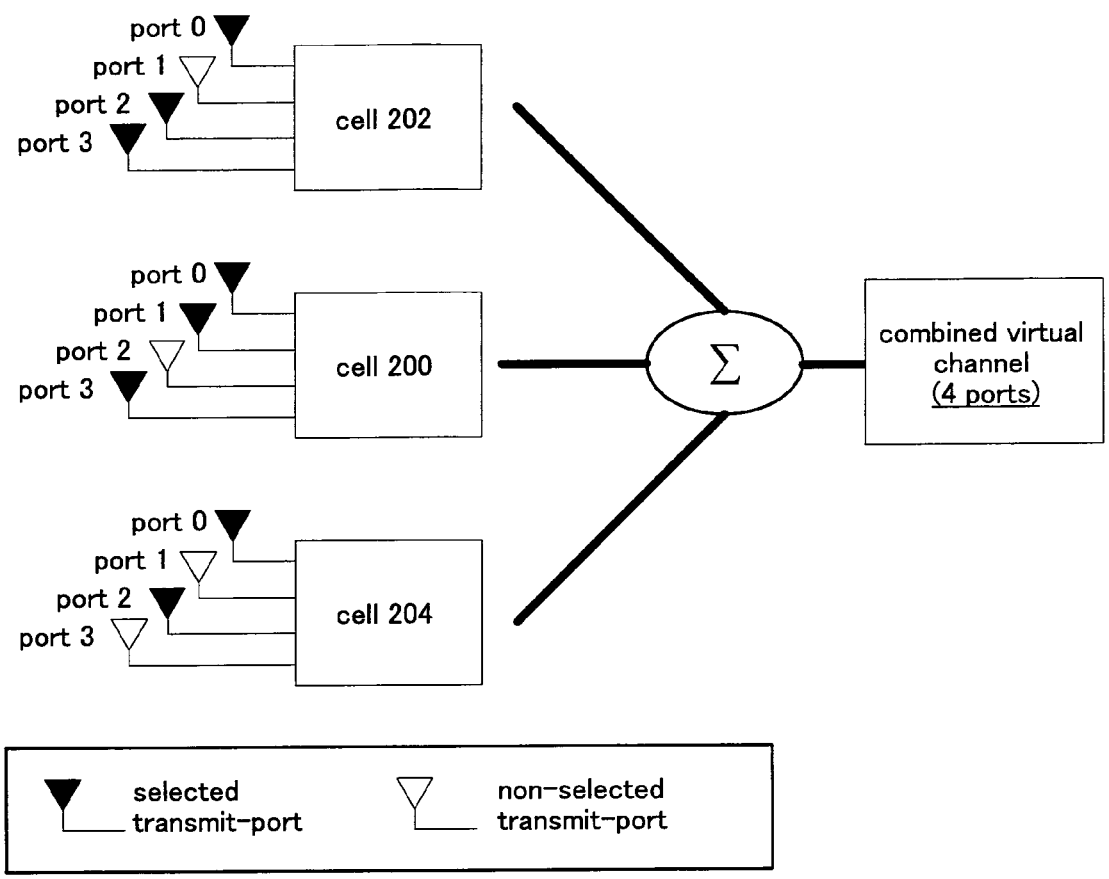
FIG. 12

Embodiment scenario Example (a): the serving cell of the user equipment 416 is cell 202 and the cooperative cells are cells 200 and 204. The system adopts the above scheme (4) for the multi-antenna-multi-cell cooperation communication. After the transmit-port selection, transmit-ports 0, 2 and 3 of the serving cell 202 and transmit-ports 0, 1 and 3 of the cooperative cell 200 and transmit-ports 0 and 2 of the cooperative cell 204 are selected. Then these transmit-ports of these three cells are directly added and combined to constitute a virtual channel such that MIMO communication can be performed. FIG. 12 schematically illustrates the implementations.

Figure 13:
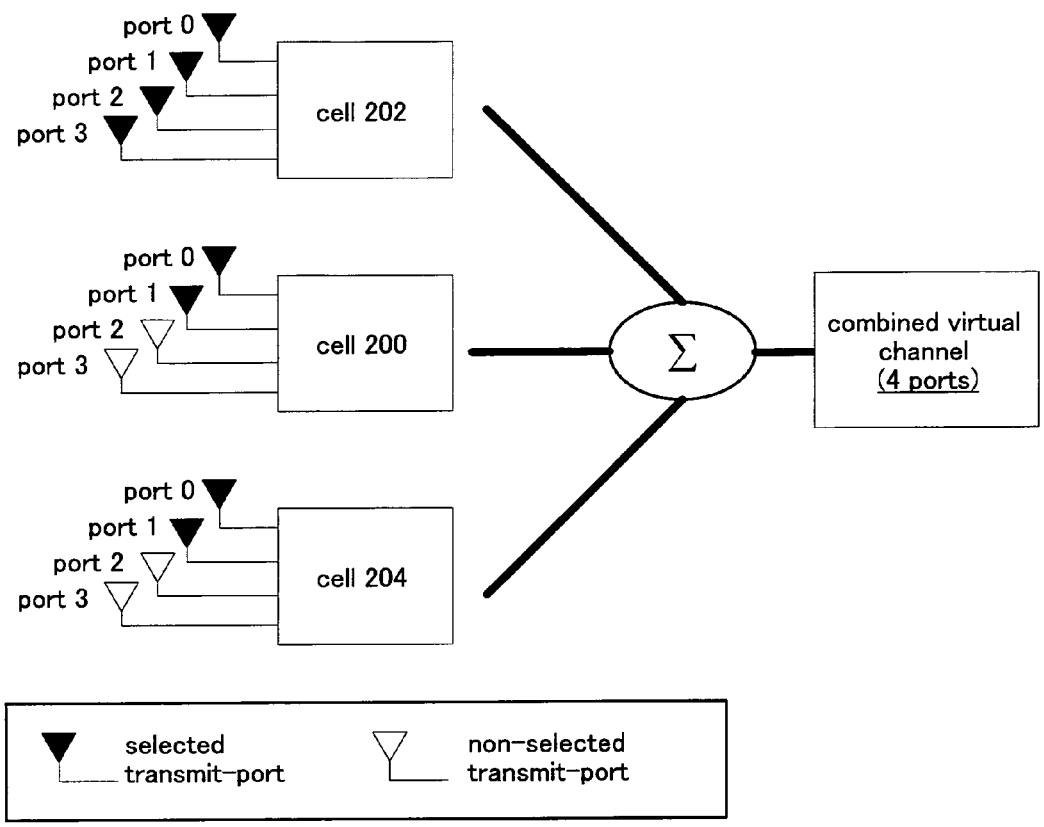
FIG. 13

Embodiment scenario Example (b): the serving cell of the user equipment 416 is cell 202 and the cooperative cells are cell 200 and 204. The system adopts the above scheme (4) for the multi-antenna-multi-cell cooperation communication. After the transmit-port selection, transmit-ports 0-3 of the serving cell 202 are all selected, transmit-ports 0 and 1 of the cooperative cell 200 and transmit-ports 0 and 1 of the cooperative cell 204 are also selected. Then these transmit-ports of these three cells are directly added and combined to constitute a virtual channel such that MIMO communication can be performed. FIG. 13 schematically illustrates the implementations.

Figure 14:
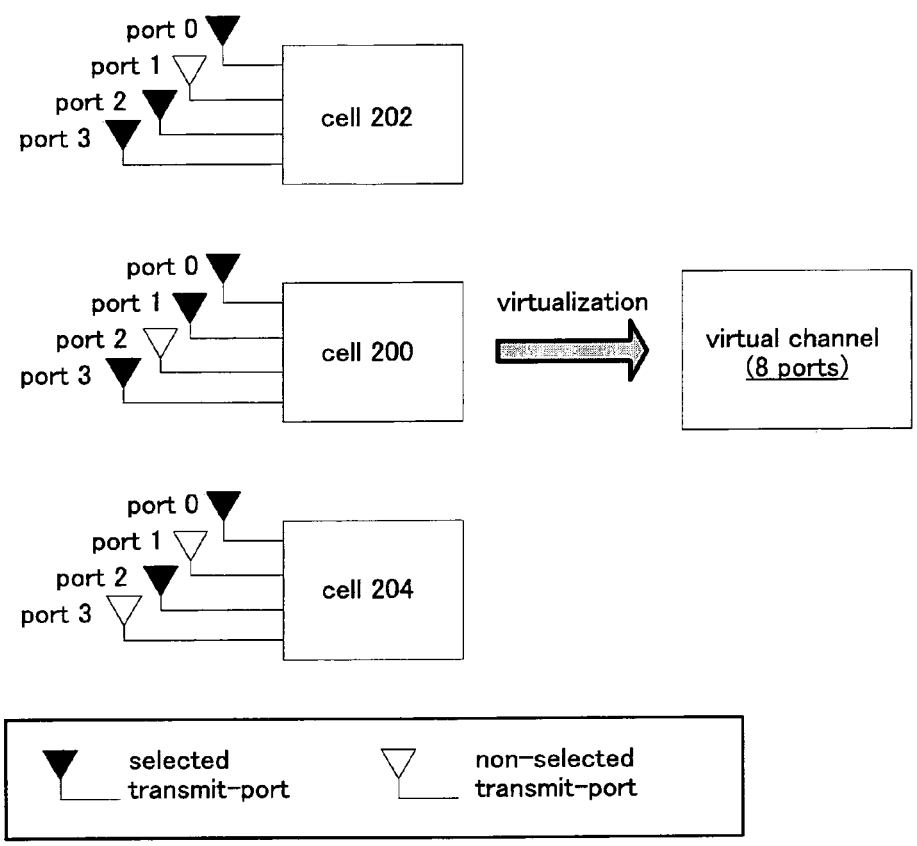
FIG. 14

Embodiment scenario Example (c): the serving cell of the user equipment 416 is cell 202 and the cooperative cells are cell 200 and 204. The system adopts the above scheme (5) for the multi-antenna-multi-cell cooperation communication. After the transmit-port selection, transmit-ports 0, 2 and 3 of the serving cell 202 and transmit-ports 0, 1 and 3 of the cooperative cell 200 and transmit-ports 0 and 2 of the cooperative cell 204 are selected. Then these 8 transmit-ports form a virtual MIMO transmit system such that MIMO communication can be performed. FIG. 14 schematically illustrates the implementations.

Figure 15:
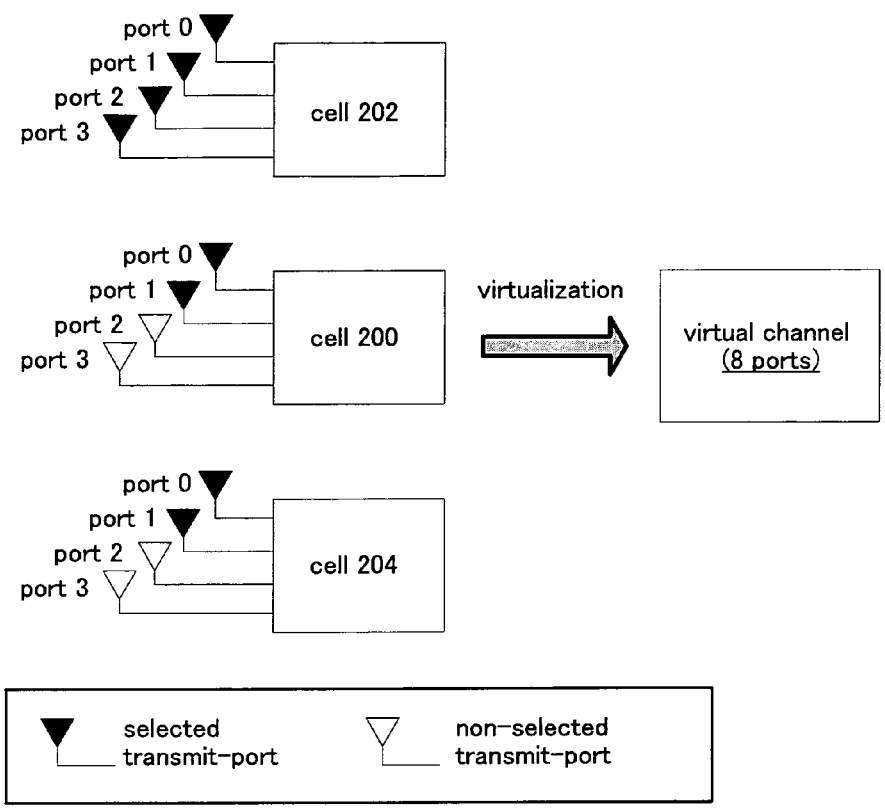
FIG. 15

Embodiment scenario Example (d): the serving cell of the user equipment 416 is cell 202 and the cooperative cells are cell 200 and 204. The system adopts the above scheme (5) for the multi-antenna-multi-cell cooperation communication. After the transmit-port selection, transmit-ports 0-3 of the serving cell 202 are all selected, transmit-ports 0 and 1 of the cooperative cell 200 and transmit-ports 0 and 1 of the cooperative cell 204 are also selected. Then these 8 transmit-ports form a virtual MIMO transmit system such that MIMO communication can be performed. FIG. 15 schematically illustrates the implementations.

It is to be noted that the above examples are only used to illustrate how the serving cell configures the user equipment according to the present invention and the configuration information of the serving cell according to the present invention is not limited to the described examples.

Step 506: the user equipment obtains the channel state information of the selected transmit-ports.

The user equipment estimates downlink channels from all ports of the cooperating cell set to the user equipment according to a downlink reference signal of the cooperating cell set (including the serving cell and non-serving cell), and then selects necessary transmit-ports so as to obtain the channel state information of the selected transmit-ports.

Step 509: the user equipment feedbacks identification information (indexes) and other channel state information of the selected transmit-ports.

Preferably, the user equipment feedbacks transmit-port indexes of a plurality of cooperative cells with a relatively long feedback period and feedbacks the channel state information of the selected transmit-ports with a relatively short period. The channel state information can be any one of the following three kinds of forms or a combination of some of them, which are perfect channel state information, statistics based channel state information and codebook space search based channel state information (which may include channel rank and/or precoding matrix and/or channel quality indicator, etc).

Preferably, if the feedback of the transmit-port indexes of non-serving cells and the feedback of other information collide within the same transmission time interval, simultaneous feedback can be adopted; or the feedback of the channel state information of the serving cell and/or the channel state information of non-serving cells under the condition of transmit-ports can be removed but the feedback of the transmit-port indexes of non-serving cells is remained; or only a part of the channel state information of the serving cell and/or the channel state information of non-serving cells under the condition of transmit-port is fed back but the feedback of the transmit-port indexes of non-serving cells is remained.

Alternatively, the user equipment feedbacks transmit-port indexes of non-serving cells with a relatively long feedback period and feedbacks, with a relatively short period, the channel state information of all transmit-ports of the serving cell and the channel state information of the selected transmit-ports of the non-serving cells. The channel state information can be any one of the following three kinds of forms or a combination of some of them, which are perfect channel state information, statistics based channel state information and codebook space search based channel state information (which may include channel rank and/or precoding matrix and/or channel quality indicator, etc).

Preferably, if the feedback of the transmit-port indexes of non-serving cells and the feedback of other information collide within the same transmission time interval, simultaneous feedback can be adopted; or the feedback of the channel state information of the serving cell and/or the channel state information of non-serving cells under the condition of transmit-ports can be removed but the feedback of the transmit-port indexes of non-serving cells is remained; or only a part of the channel state information of the serving cell and/or the channel state information of non-serving cells under the condition of transmit-ports is fed back but the feedback of the transmit-port indexes of non-serving cells is remained.

Alternatively, the user equipment feedbacks transmit-port indexes of non-serving cells with a relatively long feedback period and feedbacks, with a relatively short period, the channel state information of all transmit-ports of the serving cell and the channel state information of the non-serving cells under the condition of transmit-ports. The channel state information can be any one of the following three kinds of forms or a combination of some of them, which are perfect channel state information, statistics based channel state information and codebook space search based channel state information (which may include channel rank and/or precoding matrix and/or channel quality indicator, etc.). Moreover, the user equipment feedbacks channel cross-correlation information between cells.

Preferably, if the feedback of the transmit-port indexes of non-serving cells and the feedback of other information collide within the same transmission time interval, simultaneous feedback can be adopted; or the channel state information of the serving cell, and/or the channel state information of non-serving cells under the condition of transmit-ports, and/or the channel cross-correlation information between cells can be removed but the feedback of the transmit-port indexes of non-serving cells is remained; or only a part of the channel state information of the serving cell and/or the channel state information of non-serving cells under the condition of transmit-port and/or the channel cross-correlation information between cells is fed back but the feedback of the transmit-port indexes of non-serving cells is remained.

According to the present invention, selected transmit-port indexes (identification information) and other channel state information can be fed back with different feedback periods. Moreover, when the feedbacks collide, the transmit-port index (identification information) has higher priority than the other channel state information.

In the present embodiment, six application examples are presented.

Embodiment scenario Example (a): the user equipment 416 feedbacks transmit-port indexes of a plurality of cooperative cells with a relatively long feedback period and the transmit-port indexes can represent that transmit-ports 0, 2 and 3 of the serving cell 202, transmit-ports 0, 1 and 3 of the cooperative cell 200 and transmit-ports 0 and 2 of the cooperative cell 204 are selected. In addition, the user equipment 416 feedbacks the channel state information of the selected transmit-ports with a relatively short period and the channel state information is that of a virtual channel formed by directly adding and combining the transmit-ports of the above three cells. The channel state information can be any one of the following three kinds of forms or a combination of some of them:

perfect channel state information;

statistics based channel state information; and codebook space search based channel state information which may include channel rank and/or precoding matrix and/or channel quality indicator, etc.

Figure 16:
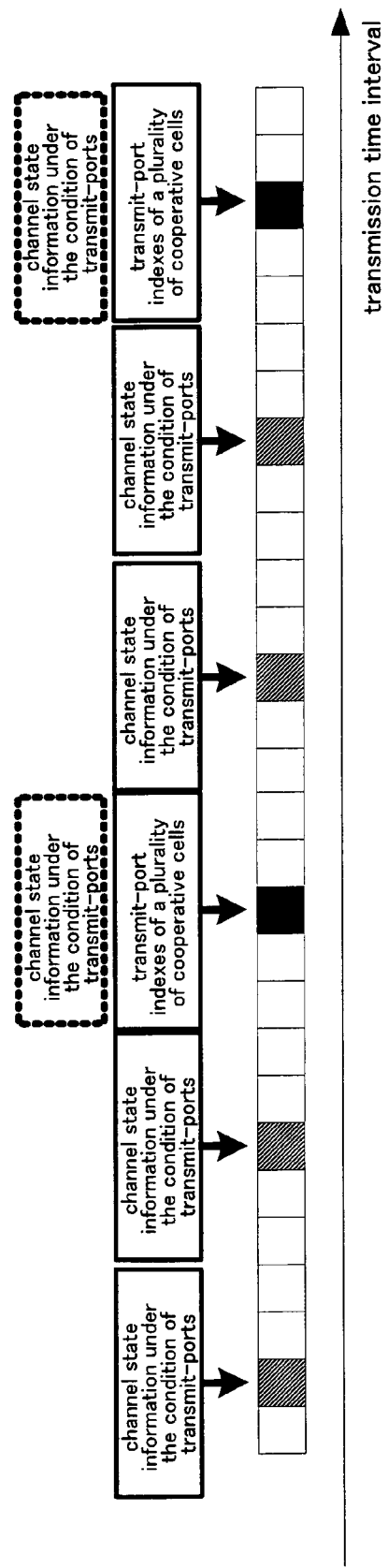
FIG. 16

FIG. 16 schematically illustrates implementations of the present embodiment. As shown in FIG. 16, the feedback period of the user equipment 416 feeding back the transmit-port indexes of a plurality of cooperative cells is long and is illustrated as having 15 transmission time intervals. The feedback period of the channel state information of the selected transmit-ports is short and is illustrated as having 5 transmission time intervals. It is to be noted that if two kinds of feedbacks collide within the same transmission time interval, simultaneous feedback can be adopted; or the feedback of the channel state information of the selected transmit-ports can be removed but the feedback of the transmit-port indexes of a plurality of cooperative cells is remained; or only a part of the channel state information of the selected transmit-ports is fed back but the feedback of the transmit-port indexes of a plurality of cooperative cells is remained.

Embodiment scenario Example (b-1): the user equipment 416 feedbacks transmit-port indexes of non-serving cells with a relatively long feedback period and the transmit-port indexes can represent that transmit-ports 0 and 1 of the cooperative cell 200 and transmit-ports 0 and 1 of the cooperative cell 204 are selected. In addition, the user equipment 416 feedbacks the channel state information of the serving cell 202 (including all of its transmit-ports 0-3) with a relatively short period. The channel state information can be any one of the following three kinds of forms or a combination of some of them:

perfect channel state information;

statistics based channel state information; and codebook space search based channel state information which may include channel rank and/or precoding matrix and/or channel quality indicator, etc.

The user equipment further feedbacks the channel state information of non-serving cells 200 and 204 under the condition of transmit-ports. The channel state information can be any one of the following three kinds of forms or a combination of some of them:

perfect channel state information;

statistics based channel state information; and codebook space search based channel state information which may include channel rank and/or precoding matrix and/or channel quality indicator, etc.

The serving cell 202 can obtain the channel state information of a virtual channel formed by directly adding and combining transmit-ports of above three cells according to the feedback from the user equipment.

Figure 17:
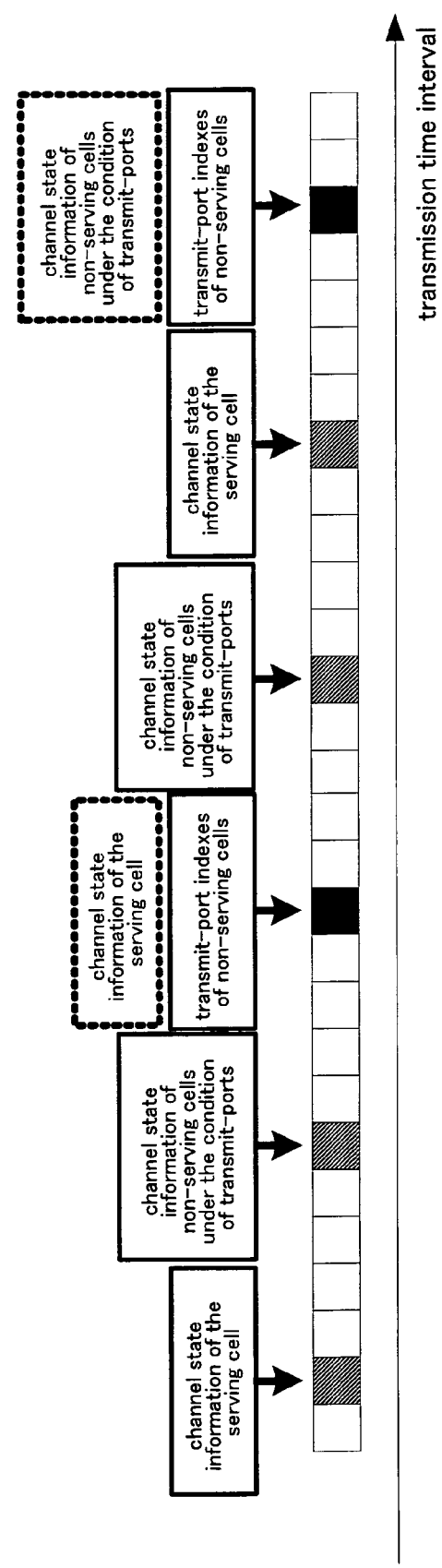
FIG. 17

FIG. 17 schematically illustrates implementations of information feedback of the user equipment 416. As shown in FIG. 17, the feedback period of the user equipment 416 feeding back the transmit-port indexes of non-serving cells is long and is illustrated as having 15 transmission time intervals. The feedback period of the channel state information of the serving cell 202 and the feedback period of the channel state information of non-serving cells 200 and 204 under the condition of transmit-ports are short and are illustrated as having 10 transmission time intervals.

It is to be noted that if the feedback of the transmit-port indexes of non-serving cells and other feedback formats collide within the same transmission time interval, simultaneous feedback can be adopted; or the feedback of the channel state information of the serving cell and/or the channel state information of the non-serving cells under the condition of transmit-ports can be removed but the feedback of the transmit-port indexes of the non-serving cells is remained; or only a part of the channel state information of the serving cell and/or the channel state information of the non-serving cells under the condition of transmit-ports is fed back but the feedback of the transmit-port indexes of non-serving cells is remained. In addition, the channel state information of the serving cell and the channel state information of the non-serving cells under the condition of transmit-ports can be combined and be fed back at the same time in the present embodiment as long as these two feedbacks are set to be in synchronization.

Embodiment scenario Example (b-2): the user equipment 416 feedbacks transmit-port indexes of non-serving cells with a relatively long feedback period and the transmit-port indexes can represent that transmit-ports 0 and 1 of the cooperative cell 200 and transmit-ports 0 and 1 of the cooperative cell 204 are selected. In addition, the user equipment 416 feedbacks the channel state information of the serving cell 202 (including all of its transmit-ports 0-3) with a relatively short period. The channel state information can be any one of the following three kinds of forms or a combination of some of them:

perfect channel state information;

statistics based channel state information; and codebook space search based channel state information which may include channel rank and/or precoding matrix and/or channel quality indicator, etc.

The user equipment 416 further feedbacks the channel state information of non-serving cells 200 and 204 under the condition of transmit-ports. The channel state information can be any one of the following three kinds of forms or a combination of some of them:

perfect channel state information;

statistics based channel state information; and codebook space search based channel state information which may include channel rank and/or precoding matrix and/or channel quality indicator, etc.

The user equipment further feedbacks channel cross-correlation information between the serving cell 202 and non-serving cells 200 and 204, such as cross-correlation coefficients and cross-correlation matrix.

The serving cell 202 can obtain the channel state information of a virtual channel formed by directly adding and combining transmit-ports of above three cells according to the feedback from the user equipment.

Figure 18:
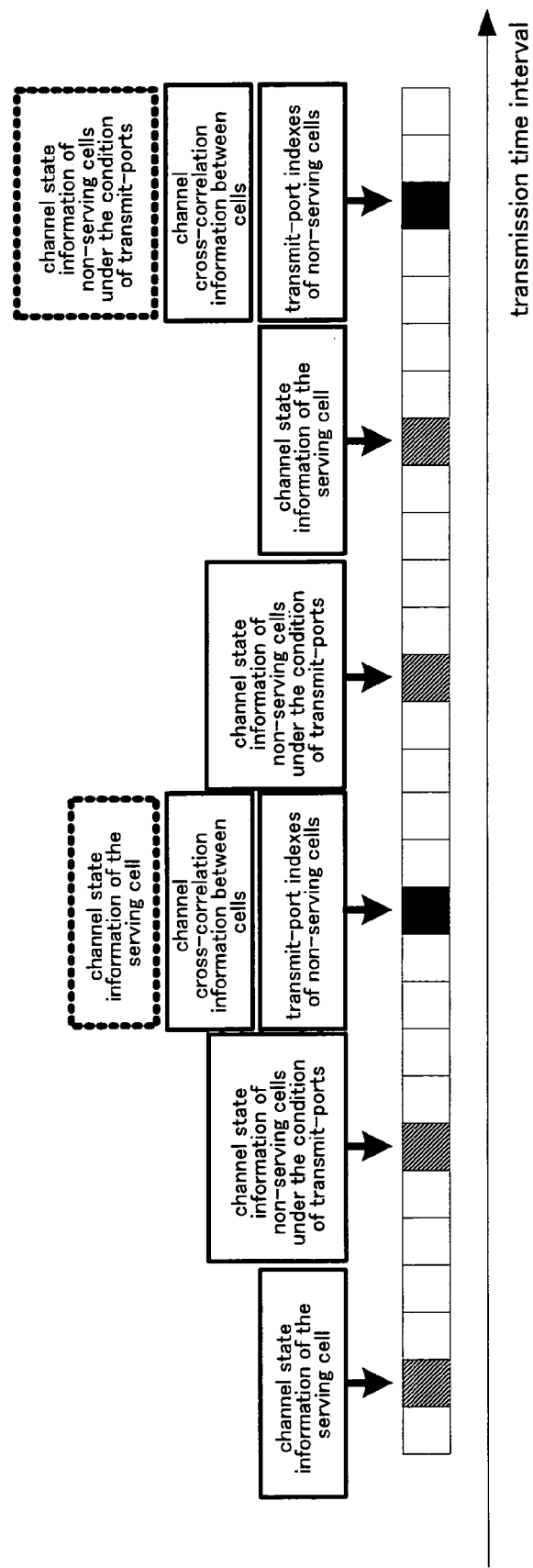
FIG. 18

FIG. 18 schematically illustrates implementations of the information feedback of the user equipment 416. As shown in FIG. 18, the feedback period of the user equipment 416 feeding back the transmit-port indexes of non-serving cells is long and is illustrated as having 15 transmission time intervals. The feedback period of the channel state information of the serving cell 202 and the feedback period of the channel state information of non-serving cells 200 and 204 under the condition of transmit-ports are short and are illustrated as having 10 transmission time intervals. Moreover, the feedback period of the channel cross-correlation information between the serving cell 202 and non-serving cells 200 and 204 is illustrated as having 15 transmission time intervals. In practical operation, skills in the art can make corresponding settings according to variations of the channels. FIG. 18 is only an illustration example and does not mean that implementations of the present invention are limited by corresponding numerical values.

It is to be noted that if the feedback of the transmit-port indexes of non-serving cells and other feedback formats collide within the same transmission time interval, simultaneous feedback can be adopted; or the feedback of the channel state information of the serving cell and/or the channel state information of the non-serving cells under the condition of transmit-ports and/or the channel cross-correlation information between cells can be removed but the feedback of the transmit-port indexes of the non-serving cells is remained; or only a part of the channel state information of the serving cell and/or the channel state information of the non-serving cells under the condition of transmit-ports and/or the channel cross-correlation information between cells is fed back but the feedback of the transmit-port indexes of the non-serving cells is remained. Furthermore, the channel state information of the serving cell and/or the channel state information of the non-serving cells under the condition of transmit-ports and/or the channel cross-correlation information between cells can be combined and fed back together in the present embodiment as long as these feedbacks are set to be in synchronization.

Embodiment scenario Example (c): the user equipment 416 feedbacks transmit-port indexes of a plurality of cooperative cells with a relatively long feedback period and the transmit-port indexes can represent that transmit-ports 0, 2 and 3 of the serving cell 202, transmit-ports 0, 1 and 3 of the cooperative cell 200 and transmit-ports 0 and 2 of the cooperative cell 204 are selected. In addition, the user equipment 416 feedbacks the channel state information of the selected transmit-ports with a relatively short period and the channel state information is that of a virtual MIMO transmission system constituted by these 8 transmit-ports. The channel state information can be any one of the following three kinds of forms or a combination of some of them:
perfect channel state information;
statistics based channel state information; and
codebook space search based channel state information which may include channel rank and/or precoding matrix and/or channel quality indicator, etc.

FIG. 16 schematically illustrates implementations of the present embodiment. As shown in FIG. 16, the feedback period of the user equipment 416 feeding back the transmit-port indexes of a plurality of cooperative cells is long and is illustrated as having 15 transmission time intervals. The feedback period of the channel state information of the selected transmit-ports is short and is illustrated as having 5 transmission time intervals. It is to be noted that if two kinds of feedbacks collide within the same transmission time interval, simultaneous feedback can be adopted; or the feedback of the channel state information of the selected transmit-ports can be removed but the feedback of the transmit-port indexes of a plurality of cooperative cells is remained; or only a part of the channel state information of the selected transmit-ports is fed back but the feedback of the transmit-port indexes of a plurality of cooperative cells is remained.

Embodiment scenario Example (d-1): the user equipment 416 feedbacks transmit-port indexes of non-serving cells with a relatively long feedback period and the transmit-port indexes can represent that transmit-ports 0 and 1 of the cooperative cell 200 and transmit-ports 0 and 1 of the cooperative cell 204 are selected. In addition, the user equipment 416 feedbacks the channel state information of the serving cell 202 (including all of its transmit-ports 0-3) with a relatively short period. The channel state information can be any one of the following three kinds of forms or a combination of some of them:
perfect channel state information;
statistics based channel state information; and
codebook space search based channel state information which may include channel rank and/or precoding matrix and/or channel quality indicator, etc.

The user equipment further feedbacks the channel state information of non-serving cells 200 and 204 under the condition of transmit-ports. The channel state information can be any one of the following three kinds of forms or a combination of some of them:
perfect channel state information;
statistics based channel state information; and
codebook space search based channel state information which may include channel rank and/or precoding matrix and/or channel quality indicator, etc.

The serving cell 202 can obtain the channel state information of a virtual MIMO transmission system constituted by 8 transmit-ports which are transmit-ports 0-3 of the serving cell 202, transmit-ports 0 and 1 of the cooperative cell 200 and transmit-ports 0 and 1 of the cooperative cell 204 according to the feedback from the user equipment.

FIG. 17 schematically illustrates information feedback implementations of the user equipment 416. As shown in FIG. 17, the feedback period of the user equipment 416 feeding back the transmit-port indexes of non-serving cells is long and is illustrated as having 15 transmission time intervals. The feedback period of the channel state information of the serving cell 202 and the feedback period of the channel state information of non-serving cells 200 and 204 under the condition of transmit-ports are short and are illustrated as having 10 transmission time intervals.

It is to be noted that if the feedback of the transmit-port indexes of non-serving cells and other feedback formats collide within the same transmission time interval, simultaneous feedback can be adopted; or the feedback of the channel state information of the serving cell and/or the channel state information of the non-serving cells under the condition of transmit-ports can be removed but the feedback of the transmit-port indexes of the non-serving cells is remained; or only a part of the channel state information of the serving cell and/or the channel state information of the non-serving cells under the condition of transmit-ports is fed back but the feedback of the transmit-port indexes of non-serving cells is remained. In addition, the channel state information of the serving cell and the channel state information of the non-serving cells under the condition of transmit-ports can be combined and fed back together in the present embodiment as long as these two feedbacks are set to be in synchronization.

Embodiment scenario Example (d-2): the user equipment 416 feedbacks transmit-port indexes of non-serving cells with a relatively long feedback period and the transmit-port indexes can represent that transmit-ports 0 and 1 of the cooperative cell 200 and transmit-ports 0 and 1 of the cooperative cell 204 are selected. In addition, the user equipment 416 feedbacks the channel state information of the serving cell 202 (including all of its transmit-ports 0-3) with a relatively short period. The channel state information can be any one of the following three kinds of forms or a combination of some of them:
perfect channel state information;
statistics based channel state information; and
codebook space search based channel state information which may include channel rank and/or precoding matrix and/or channel quality indicator, etc.

The user equipment 416 further feedbacks the channel state information of non-serving cells 200 and 204 under the condition of transmit-ports with a relatively short feedback period. The channel state information can be any one of the following three kinds of forms or a combination of some of them:
perfect channel state information;
statistics based channel state information; and
codebook space search based channel state information which may include channel rank and/or precoding matrix and/or channel quality indicator, etc.

The user equipment 416 further feedbacks the channel cross-correlation information between the serving cell 202 and non-serving cells 200 and 204, such as cross-correlation coefficients and cross-correlation matrix.

The serving cell 202 can obtain the channel state information of a virtual MIMO transmission system constituted by 8 transmit-ports that are transmit-ports 0-3 of the serving cell 202, transmit-ports 0 and 1 of the cooperative cell 200 and transmit-ports 0 and 1 of the cooperative cell 204 according to the feedback from the user equipment.

FIG. 18 schematically illustrates implementations of information feedback of the user equipment 416. As shown in FIG. 18, the feedback period of the user equipment 416 feeding back the transmit-port indexes of non-serving cells is long and is illustrated as having 15 transmission time intervals. The feedback period of the channel state information of the serving cell 202 and the feedback period of the channel state information of non-serving cells 200 and 204 under the condition of transmit-ports are short and are illustrated as having 10 transmission time intervals. Moreover, the feedback period of the channel cross-correlation information between the serving cell 202 and non-serving cells 200 and 204 is illustrated as having 15 transmission time intervals. In practical operation, skills in the art can make corresponding settings according to variations of the channels. FIG. 18 is only an illustration example and does not mean that implementations of the present invention are limited by corresponding numerical values.

It is to be noted that if the feedback of the transmit-port indexes of non-serving cells and other feedback formats collide within the same transmission time interval, simultaneous feedback can be adopted; or the feedback of the channel state information of the serving cell and/or the channel state information of the non-serving cells under the condition of transmit-ports and/or the channel cross-correlation information between cells can be removed but the feedback of the transmit-port indexes of the non-serving cells is remained; or only a part of the channel state information of the serving cell and/or the channel state information of the non-serving cells under the condition of transmit-ports and/or the channel cross-correlation information between cells is fed back but the feedback of the transmit-port indexes of the non-serving cells is remained. Furthermore, the channel state information of the serving cell and/or the channel state information of the non-serving cells under the condition of transmit-ports and/or the channel cross-correlation information between cells can be combined and fed back together in the present embodiment as long as these feedbacks are set to be in synchronization.

It is to be noted that the examples here are only used to explain the implementation procedure of the user equipment feeding back the selected transmit-port information and other channel state information and it does not mean that the present invention is limited to the formats and values in the above examples.

Then the serving cell allocates resources for the user equipment according to the feedback information from the user equipment. The serving cell and cooperative cells transmit cooperatively data signal to the user equipment through their respective selected transmit-ports.

Preferably, the total number of cooperative transmit-ports of the cells is restricted to finite possibilities.

In order to simplify the system design, the total number of cooperative transmit-ports of the cells is restricted to finite possibilities, for example, 3 possibilities (4 ports, 8 ports and 12 ports). Thus, only three schemes respectively for 4 ports, 8 ports and 12 ports need to be predefined during the multi-antenna-multi-cell cooperative transmission.

It is to be noted that the present embodiment does not limit the cooperative transmission method for the multi-antenna-multi-cell system. For example, any one or more from seven downlink data transmission modes in LTE system can be adopted.

Preferably, a transmit-antenna combination method is adopted to map a plurality of antennas to a single transmit-port.

It is also to be noted that in order to maintain a cell transmit total power unchanged, powers of unselected transmit-ports of the cell needs to be superimposed on that of the selected transmit-ports, however, this possibly leads to overload of the cell antenna transmit power. The main reason is that the antenna transmit power can only vary in a finite range in a practical system and adding excess power to a certain antenna will cause problems such as signal clipping distortion.

In order to solve this problem, the transmit-antenna combination method can be adopted, which combines a plurality of cell antennas in a way of transmission weighting so as to map a plurality of antennas to a single transmit-port (see non-patent Literature 6: 3GPP, R1-092427, "CSI-RS Design for Virtualized LTE Antenna in LTE-A System", Fujitsu).

Figure 19:
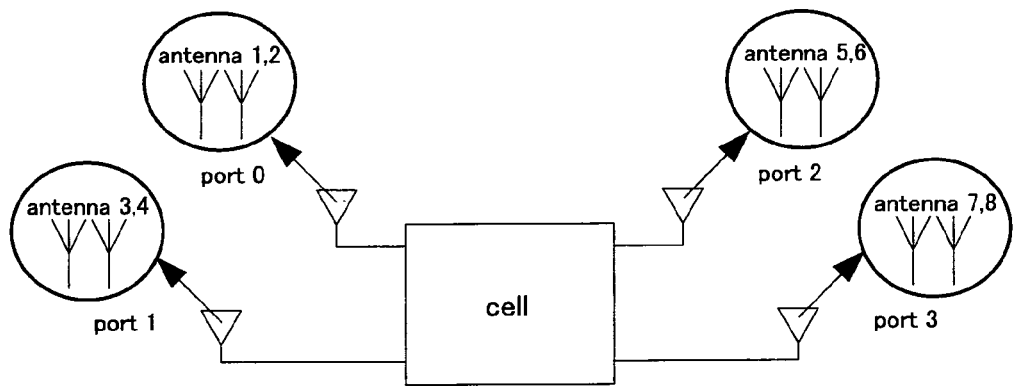
FIG. 19

FIG. 19 is an implementation schematic diagram illustrating this scheme which maps a 8-antenna transmitter to a 4-port transmitter.

Hardware Implementation

Figure 20:
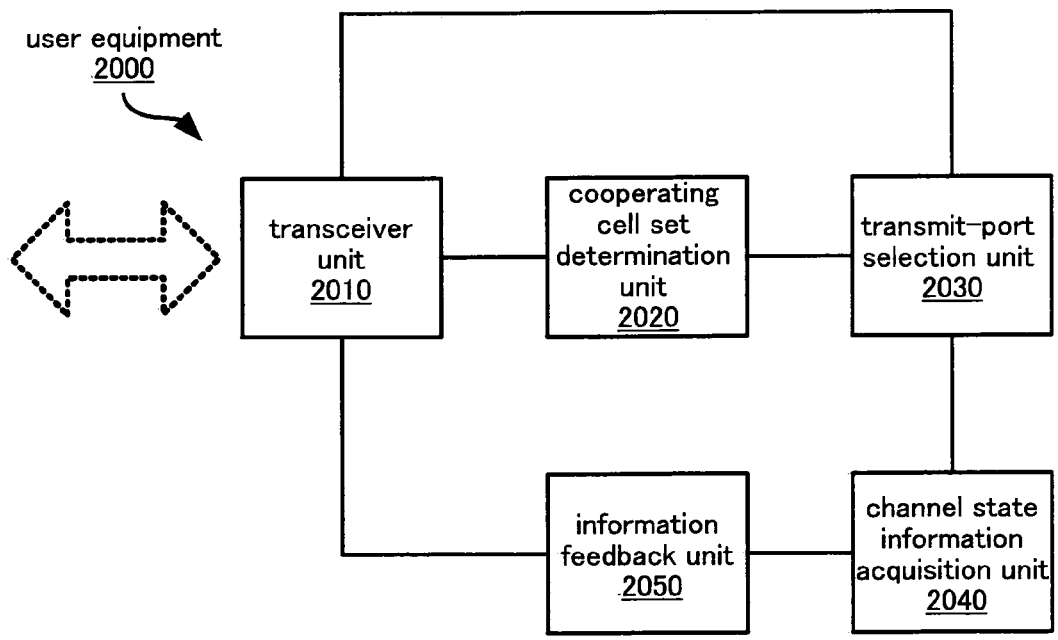
FIG. 20

FIG. 20 is a block diagram illustrating a user equipment 2000 according to an embodiment of the present invention.

As shown in FIG. 20, the user equipment 2000 according to an embodiment of the present invention includes a transceiver unit 2010 for receiving/transmitting wireless information from/to the serving cell, a cooperating cell set determination unit 2020 for determining a cooperating cell set (consisting of serving cell and non-serving cells) that participates in the multi-antenna-multi-cell cooperation, a transmit-port selection unit 2030 for selecting transmit-ports of the serving cell and non-serving cells in the determined cooperating cell set, a channel state information acquisition unit 2040 for obtaining the channel state information of the selected transmit-ports and an information feedback unit 2050 for feeding back indexes and the channel state information of the selected transmit-ports through the transceiver unit 2010.

The cooperating cell set determination unit 2020 directly determines the cooperating cell set statically configured or semi-statically configured or selected by the serving cell from the wireless information received from the transceiver unit 2010. Similarly, the transmit-port selection unit 2030 can directly select the transmit-ports statically configured or semi-statically configured or selected by the serving cell from the wireless information received from the transceiver unit 2010.

The information feedback unit 2050 feedbacks the transmit-port indexes of a plurality of cooperative cells with a relatively long feedback period and feedbacks the channel state information of the selected transmit-ports with a relatively short period. The channel state information can be any one of the following three kinds of forms or a combination of some of them: perfect channel state information; statistics based channel state information; and codebook space search based channel state information which may include channel rank and/or precoding matrix and/or channel quality indicator, etc. If the feedback of the transmit-port indexes of a plurality of cooperative cells and the feedback of channel state information of the selected transmit-ports collide within the same transmission time interval, the information feedback unit 2050 can adopt simultaneous feedback; or can remove the feedback of the channel state information of the selected transmit-ports but remain the feedback of the transmit-port indexes of a plurality of cooperative cells; or can only feedback a part of the channel state information of the selected transmit-ports and remain the feedback of the transmit-port indexes of a plurality of cooperative cells.

Alternatively, the information feedback unit 2050 feedbacks the transmit-port indexes of non-serving cells with a relatively long feedback period and feedbacks the channel state information of the selected transmit-ports and the channel state information of the non-serving cells under the condition of transmit-ports with a relatively short period. The channel state information can be any one of the following three kinds of forms or a combination of some of them: perfect channel state information; statistics based channel state information; and codebook space search based channel state information which may include channel rank and/or precoding matrix and/or channel quality indicator, etc. If the feedback of the transmit-port indexes of the non-serving cells and the feedback of other information collide within the same transmission time interval, the information feedback unit 2050 can adopt simultaneous feedback; or can remove the feedback of the channel state information of the serving cell and/or the channel state information of the non-serving cells under the condition of transmit-ports but remain the feedback of the transmit-port indexes of the non-serving cells; or can only feedback a part of the channel state information of the serving cell and/or the channel state information of the non-serving cells under the condition of transmit-ports and remain the feedback of the transmit-port indexes of the non-serving cells.

The information feedback unit 2050 feedbacks the transmit-port indexes of non-serving cells with a relatively long feedback period and feedbacks the channel state information of the selected transmit-ports and the channel state information of the non-serving cells under the condition of transmit-ports with a relatively short period. The channel state information can be any one of the following three kinds of forms or a combination of some of them: perfect channel state information; statistics based channel state information; and codebook space search based channel state information which may include channel rank and/or precoding matrix and/or channel quality indicator, etc. Moreover, the information feedback unit 2050 feedbacks channel cross-correlation information between cells. If the feedback of the transmit-port indexes of the non-serving cells and the feedback of other information collide within the same transmission time interval, the information feedback unit 2050 can adopt simultaneous feedback; or can remove the feedback of the channel state information of the serving cell and/or the channel state information of the non-serving cells under the condition of transmit-ports and/or the channel cross-correlation information between cells but remain the feedback of the transmit-port indexes of the non-serving cells; or can only feedback a part of the channel state information of the serving cell and/or the channel state information of the non-serving cells under the condition of transmit-ports and/or the channel cross-correlation information between cells and at least remain the feedback of the transmit-port indexes of the non-serving cells.

It is to be noted that in the above descriptions the technical solution of the present invention is explained in a way of schematic examples, however the present invention is not limited to the above steps and units. In some circumstances, the steps and units may be adjusted and accepted or rejected based on the demands. Therefore, some steps and units are not necessary for implementing the invention idea of the present invention. Therefore, the necessary technical features of the present invention are only restricted by the lowest requirements for implementing the invention idea of the present invention and are not restricted by the above detailed embodiments.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. An information feedback method, comprising:
determining, by a serving cell and/or a user equipment, a cooperating cell set participating in a multi-antenna-multi-cell cooperation, the cooperating cell set including the serving cell and non-serving cells,
selecting, by the user equipment and/or the serving cell, transmit-ports of the serving cell and non-serving cells according to the determined cooperating cell set,
obtaining, by the user equipment, channel state information of the selected transmit-ports, and
feeding back, by the user equipment, identification information and the channel state information of the selected transmit-ports.

2. The method of claim 1, further comprising:
allocating, by the serving cell, resources to the user equipment according to feedback information from the user equipment, and
cooperatively transmitting, by the serving cell and a cooperating cell, a data signal to the user equipment through respectively selected transmit-ports of themselves.

3. The method of claim 1, wherein the user equipment feedbacks the identification information of selected transmit-ports of respective cooperative cells with a first feedback period, and
feedbacks the channel state information of the selected transmit-ports with a second feedback period.

4. The method of claim 3, wherein if feeding back the identification information of selected transmit-ports of respective cooperative cells and feeding back the channel state information of selected transmit-ports collide in the same transmission time interval, simultaneous feedback is adopted, or
only the identification information of selected transmit-ports of respective cooperative cells is fed back, or
the identification information of selected transmit-ports of respective cooperative cells and a part of the channel state information of selected transmit-ports are fed back.

5. The method of claim 3, wherein if feeding back the identification information of selected transmit-ports of respective non-serving cells and feeding back the channel state information of selected transmit-ports collide in the same transmission time interval, simultaneous feedback is adopted, or
only the identification information of selected transmit-ports of respective non-serving cells is fed back, or
the identification information of selected transmit-ports of respective non-serving cells and a part of the channel state information of selected transmit-ports are fed back.

6. The method of claim 3, wherein the channel state information is one kind or a combination of several kinds of a group consisting of perfect channel state information, statistics based channel state information and codebook space search based channel state information.

7. The method of claim 6, wherein the codebook space search based channel state information comprises at least one of a group consisting of channel rank, precoding matrix and channel quality indicator.

8. The method of claim 3, wherein the first feedback period is longer than the second feedback period.

9. The method of claim 1, wherein the user equipment and/or the serving cell select all transmit-ports of the serving cell, and
the user equipment feedbacks the identification information of selected transmit-ports of respective non-serving cells with a first feedback period, and feedbacks the channel state information of all selected transmit-ports of the serving cell and the channel state information of selected transmit-ports of respective non-serving cells with a second feedback period.

10. The method of claim 9, further comprising:
feeding back, by the user equipment, channel cross-correlation information between cooperative cells with the second feedback period.

11. The method of claim 10, wherein if feeding back the identification information of selected transmit-ports of respective non-serving cells collides with feeding back the channel state information of selected transmit-ports and/or the channel cross-correlation information between cooperative cells in the same transmission time interval, simultaneous feedback is adopted, or only the identification information of selected transmit-ports of respective non-serving cells is fed back, or all the identification information of selected transmit-ports of respective non-serving cells and a part of the channel state information of selected transmit-ports and/or the channel cross-correlation information between cooperative cells are fed back.

12. A user equipment, comprising:

a transceiver unit configured to receive or transmit wireless information from or to a serving cell, a cooperating cell set determination unit configured to determine a cooperating cell set participating in a multi-antenna-multi-cell cooperation, the cooperating cell set including the serving cell and non-serving cells, a transmit-port selection unit configured to select transmit-ports of the serving cell and non-serving cells in the determined cooperating cell set, a channel state information acquisition unit configured to obtain channel state information of the selected transmit-ports, and an information feedback unit configured to feedback identification information and the channel state information of the selected transmit-ports through the transceiver unit.

13. The user equipment of claim 12, wherein the cooperating cell set determination unit directly determines the cooperating cell set statically configured, or semi-statically configured or selected by the serving cell from the wireless information received by the transceiver unit, and the transmit-port selection unit directly selects the transmit-ports statically configured, or semi-statically configured or selected by the serving cell from the wireless information received by the transceiver unit.

14. The user equipment of claim 13, wherein information relative to the selected transmit-ports indicates that all transmit-ports of the serving cell are selected, and the information feedback unit feedbacks the identification information of selected transmit-ports of respective non-serving cells with a first feedback period, and feedbacks the channel state information of all transmit-ports of the serving cell and the channel state information of selected transmit-ports of respective non-serving cells with a second feedback period.

* * * * *